United States Patent
Kawakami et al.

(10) Patent No.: US 9,923,214 B2
(45) Date of Patent: Mar. 20, 2018

(54) HEAT EXCHANGING SYSTEM THAT EXCHANGES HEAT BETWEEN REFRIGERANT AND A TEMPERATURE REGULATED PORTION

(71) Applicants: Yoshiaki Kawakami, Nagoya (JP); Yuki Jojima, Nagoya (JP); Eizo Takahashi, Chiryu (JP); Kousuke Sato, Toyota (JP)

(72) Inventors: Yoshiaki Kawakami, Nagoya (JP); Yuki Jojima, Nagoya (JP); Eizo Takahashi, Chiryu (JP); Kousuke Sato, Toyota (JP)

(73) Assignees: TOYOTA JIDOSHA KABUSHIKI KAISHA, Toyota (JP); DENSO CORPORATION, Kariya-shi (JP)

( * ) Notice: Subject to any disclaimer, the term of this patent is extended or adjusted under 35 U.S.C. 154(b) by 734 days.

(21) Appl. No.: 14/358,132

(22) PCT Filed: Nov. 16, 2012

(86) PCT No.: PCT/IB2012/002384
§ 371 (c)(1),
(2) Date: May 14, 2014

(87) PCT Pub. No.: WO2013/072754
PCT Pub. Date: May 23, 2013

(65) Prior Publication Data
US 2014/0311180 A1    Oct. 23, 2014

(30) Foreign Application Priority Data

Nov. 17, 2011  (JP) .................................. 2011-251241

(51) Int. Cl.
*F25B 39/04* (2006.01)
*H01M 8/04007* (2016.01)
(Continued)

(52) U.S. Cl.
CPC .... *H01M 8/04059* (2013.01); *B60H 1/00278* (2013.01); *B60H 1/00385* (2013.01);
(Continued)

(58) Field of Classification Search
CPC .... F25B 2313/0254; F25B 2313/02541; F25B 2400/0403; F25B 2400/0411;
(Continued)

(56) References Cited

U.S. PATENT DOCUMENTS 5,839,656 A     11/1998  Yamano et al.
6,266,965 B1 *  7/2001   Takano ................ B60H 1/3225
                                                     62/126
(Continued)

FOREIGN PATENT DOCUMENTS

CN       1840988 A      10/2006
DE       19644583 A1 *  4/1998
(Continued)

OTHER PUBLICATIONS

Machine Translation of Description of DE-19644583.*

*Primary Examiner* — Orlando E Aviles Bosques
(74) *Attorney, Agent, or Firm* — Oliff PLC

(57) ABSTRACT

A heat exchanging system exchanging heat between refrigerant and a battery includes: a compressor circulating refrigerant; a heat exchanger exchanging heat between the refrigerant and outside air; an expansion valve decompressing the refrigerant; a heat exchanger exchanging heat between the refrigerant and air-conditioning air; a heat exchanging portion connected in parallel with the heat exchanger and exchanging heat between the refrigerant and the battery; a bypass passage providing fluid communication between a path of the refrigerant between the compressor and the heat exchanger and a path of the refrigerant between the expansion valve and the heat exchanger; an expansion valve
(Continued)

provided in the bypass passage and decompressing the refrigerant flowing through the bypass passage; and a selector valve allowing or interrupting flow of the refrigerant via the bypass passage.

6 Claims, 10 Drawing Sheets

(51) Int. Cl.
*B60H 1/00* (2006.01)
*B60H 1/32* (2006.01)
*F25B 1/00* (2006.01)
*H01M 10/625* (2014.01)
*H01M 10/663* (2014.01)
*H01M 10/613* (2014.01)

(52) U.S. Cl.
CPC ............... *B60H 1/323* (2013.01); *F25B 1/00* (2013.01); *H01M 10/613* (2015.04); *H01M 10/625* (2015.04); *H01M 10/663* (2015.04); B60H 2001/00307 (2013.01); F25B 2313/0254 (2013.01); F25B 2313/02541 (2013.01); F25B 2400/0403 (2013.01); F25B 2400/0411 (2013.01)

(58) Field of Classification Search
CPC ............ H01M 10/663; H01M 8/04059; B60H 1/00278; B60H 1/323
See application file for complete search history.

(56) References Cited

U.S. PATENT DOCUMENTS

| | | | |
|---|---|---|---|
| 6,351,959 B1 | 3/2002 | Hirota | |
| 2002/0184908 A1* | 12/2002 | Brotz | ....................... B60H 1/00 62/259.2 |
| 2005/0229629 A1* | 10/2005 | Burk | ................... B60H 1/00878 62/498 |
| 2011/0067427 A1 | 3/2011 | Haller et al. | |
| 2011/0108242 A1* | 5/2011 | Eichberger | ......... B60H 1/00278 165/104.21 |
| 2012/0085114 A1* | 4/2012 | Graaf | ................ B60H 1/00278 62/238.7 |

FOREIGN PATENT DOCUMENTS

| | | |
|---|---|---|
| EP | 2 554 410 A1 | 2/2013 |
| JP | H06-229639 A | 8/1994 |
| JP | A-10-012286 | 1/1998 |
| JP | 2000-274838 A | 10/2000 |
| JP | 2002-352866 A | 12/2002 |
| JP | A-2005-090862 | 4/2005 |
| JP | A-2009-257254 | 11/2009 |
| JP | A-2010-081704 | 4/2010 |
| JP | 2010-281561 A | 12/2010 |
| JP | A-2010-272289 | 12/2010 |
| JP | 2011-183862 A | 9/2011 |

* cited by examiner

FIG. 3

| MODE | COMPRESSOR 12 | FLOW REGULATING VALVE 38 | SELECTOR VALVE 52 | FLOW DIVIDING VALVE 66 | SELECTOR VALVE 72 | HV DEVICE 31 | VEHICLE | BATTERY 61 | AIR CONDITIONER |
|---|---|---|---|---|---|---|---|---|---|
| AIR-CONDITIONER OPERATION MODE | OPERATED | REGULATED SUCH THAT SUFFICIENT AMOUNT OF REFRIGERANT FLOWS TO COOLING PORTION 30 | PROVIDE FLUID COMMUNICATION BETWEEN REFRIGERANT LINES 34 AND 36 | CONTROL REFRIGERANT FLOW RATE IN RESPONSE TO REQUEST FOR COOLING PERFORMANCE AND BATTERY COOLING PERFORMANCE | PROVIDE FLUID COMMUNICATION BETWEEN REFRIGERANT LINES 21 AND 22 | COOLED | OPERATED | OPERATED | COOLING |
| AIR-CONDITIONER STOP MODE | STOPPED | FULLY CLOSED | PROVIDE FLUID COMMUNICATION BETWEEN REFRIGERANT LINE 34 AND COMMUNICATION LINE 51 |  | REFRIGERANT LINE 21 AND BYPASS PASSAGE 71 ARE NOT IN FLUID COMMUNICATION WITH REFRIGERANT LINE 22 | COOLED | OPERATED | STOPPED | STOPPED |
|  |  |  |  |  |  |  | STOPPED | STOPPED | STOPPED |
| BATTERY HEATING MODE | OPERATED | FULLY CLOSED | PROVIDE FLUID COMMUNICATION BETWEEN REFRIGERANT LINE 34 AND COMMUNICATION LINE 51 | CONTROL REFRIGERANT FLOW RATE IN RESPONSE TO REQUEST FOR HEATING PERFORMANCE AND BATTERY HEATING PERFORMANCE | PROVIDE FLUID COMMUNICATION BETWEEN REFRIGERANT LINES 21 AND BYPASS PASSAGE 71 | COOLED | OPERATED | HEATED | HEATING/STOPPED |
|  |  |  |  |  |  |  | STOPPED | HEATED | HEATING/STOPPED |
| BATTERY TEMPERATURE CONTROL MODE | OPERATED | REGULATED SUCH THAT SUFFICIENT AMOUNT OF REFRIGERANT FLOWS TO COOLING PORTION 30 | PROVIDE FLUID COMMUNICATION BETWEEN REFRIGERANT LINES 34 AND 36 | REGULATED SUCH THAT ENTIRE REFRIGERANT FLOWS TO HEAT EXCHANGING PORTION 60 | PROVIDE FLUID COMMUNICATION BETWEEN REFRIGERANT LINES 21 AND 22 | COOLED | OPERATED | COOLED | STOPPED |
|  |  |  |  |  |  |  | STOPPED | COOLED | STOPPED |
| QUICK HEATING MODE | OPERATED | FULLY CLOSED | PROVIDE FLUID COMMUNICATION BETWEEN REFRIGERANT LINE 34 AND COMMUNICATION LINE 51 | REGULATED SUCH THAT ENTIRE REFRIGERANT FLOWS TO HEAT EXCHANGER 18 | PROVIDE FLUID COMMUNICATION BETWEEN REFRIGERANT LINE 21 AND BYPASS PASSAGE 71 | COOLED | OPERATED | STOPPED | HEATING |

HEAT EXCHANGING SYSTEM THAT EXCHANGES HEAT BETWEEN REFRIGERANT AND A TEMPERATURE REGULATED PORTION

BACKGROUND OF THE INVENTION

1. Field of the Invention

The invention relates to a heat exchanging system and, more particularly, to a heat exchanging system that exchanges heat between refrigerant flowing through a vapor compression refrigeration cycle and a temperature regulated portion of which the temperature is regulated.

2. Description of Related Art

In recent years, hybrid vehicles, fuel cell vehicles, electric vehicles, and the like, that travel by using the driving force of a motor become a focus of attention as one of measures against environmental issues. In such vehicles, electrical devices, such as a motor, a generator, an inverter, a converter and a battery, exchange electric power to generate heat. Therefore, these electrical devices need to be cooled. Then, there has been suggested a technique that utilizes a vapor compression refrigeration cycle, which is used as a vehicle air conditioner, to cool a heat generating element.

For example, Japanese Patent Application Publication No. 2010-81704 (JP 2010-81704 A) describes a technique for cooling a charger as follows. A circulation passage that connects the charger with a radiator and through which coolant circulates is formed. Air is delivered to the radiator as a cooling fan is driven, and coolant flowing through the radiator effectively releases heat. Coolant that has released heat in the radiator flows through the charger as a pump is driven. Heat is exchanged between the charger and the coolant. Japanese Patent Application Publication No. 2005-90862 (JP 2005-90862 A) describes a cooling system that includes a heat generating element cooling unit for cooling a heat generating element in a bypass passage that bypasses a decompressor, an evaporator and a compressor of an air-conditioning refrigeration cycle.

Incidentally, as the temperature of a battery decreases, a chemical change is suppressed inside the battery and then a power density decreases, so it may be difficult to ensure battery output when the temperature of the battery is low. In addition, as a battery characteristic, when the battery is left standing in a low temperature range, the electrical resistance inside the battery increases, and the input efficiency decreases, so the charging time increases, and the battery charging efficiency decreases. Therefore, in a low temperature environment, such as cold places having a low outside air temperature, the battery is desirably warmed moderately.

In relation to a technique for warming a battery mounted on a vehicle, for example, Japanese Patent Application Publication No. 2009-257254 (JP 2009-257254 A) describes a system that stores heat in a chemical thermal storage material while a vehicle is travelling and heats a battery with the heat stored in the chemical thermal storage material at the time when the vehicle is started. Japanese Patent Application Publication No. 10-12286 (JP 10-12286 A) describes a system that utilizes heating fluid for heating a vehicle cabin in heating a battery. Japanese Patent Application Publication No. 2010-272289 (JP 2010-272289 A) describes a system that heats refrigerant supplied to a battery by utilizing waste heat from a converter and a charger.

When a battery is charged by an external power supply, it is required to heat the battery in a low temperature environment as described above. On the other hand, the temperature of the battery increases with the duration of charging, so the battery needs to be cooled. Therefore, there is a system contradiction that heating of the battery and cooling of the battery are performed in the same system. There is a method of heating a heated object with a heater; however, an exclusive heating device and an exclusive heat exchanger need to be provided, causing an increase in cost and the size of the system, so it is not appropriate to be mounted on a vehicle.

SUMMARY OF THE INVENTION

The invention provides a heat exchanging system that is able to appropriately regulate a temperature regulated portion by adjustably heating or cooling the temperature regulated portion with a further simple configuration.

An aspect of the invention provides a heat exchanging system that exchanges heat between refrigerant and a temperature regulated portion. The heat exchanging system includes: a compressor that is used to circulate the refrigerant; a first heat exchanger that exchanges heat between the refrigerant and outside air; a first decompressor that decompresses the refrigerant; a second heat exchanger that exchanges heat between the refrigerant and air-conditioning air; a heat exchanging portion that is connected in parallel with the second heat exchanger and that exchanges heat between the refrigerant and the temperature regulated portion; a bypass passage that provides fluid communication between a path of the refrigerant between the compressor and the first heat exchanger and a path of the refrigerant between the first decompressor and the second heat exchanger; a second decompressor that is provided in the bypass passage and that decompresses the refrigerant flowing through the bypass passage; and a selector valve that allows or interrupts flow of the refrigerant via the bypass passage.

The heat exchanging system may further include a flow dividing valve that adjusts a flow rate of the refrigerant flowing to the second heat exchanger and a flow rate of the refrigerant flowing to the heat exchanging portion.

The heat exchanging system may further include a check valve that prohibits flow of the refrigerant from the bypass passage toward the first decompressor.

The heat exchanging system may further include a heat generating source and a cooling portion that cools the heat generating source with the use of the refrigerant flowing between the first heat exchanger and the first decompressor.

The heat exchanging system may further include a flow regulating valve that adjusts a flow rate of the refrigerant flowing from the first heat exchanger to the first decompressor via the cooling portion.

The heat exchanging system may further include another selector valve that switches between a circulation path in which the refrigerant circulates between the first heat exchanger and the cooling portion and a path of the refrigerant from the cooling portion toward the first decompressor.

The heat exchanging system may further include a third heat exchanger that is connected between the first heat exchanger and the first decompressor and that exchanges heat between the refrigerant and outside air, wherein the heat generating source may be cooled by the refrigerant flowing through one of paths of the refrigerant, connected in parallel between the first heat exchanger and the third heat exchanger.

In the heat exchanging system, the temperature regulated portion may be a battery.

With the heat exchanging system according to the aspect of the invention, it is possible to appropriately regulate a temperature regulated portion by adjustably heating or cooling the temperature regulated portion with a further simple configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a table that shows settings of a compressor and valves in each operation mode of the heat exchanging system;

DETAILED DESCRIPTION OF EMBODIMENTS

Figure 1:
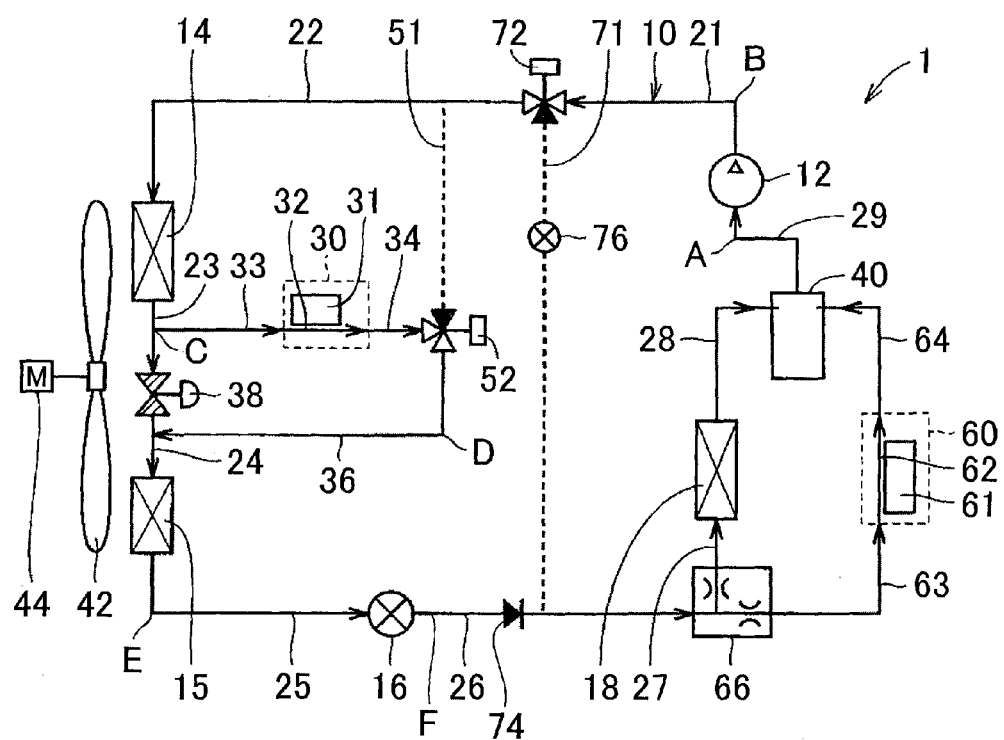
FIG. 1 is a schematic view that shows the configuration of a heat exchanging system.

Hereinafter, embodiments of the invention will be described with reference to the accompanying drawings. Note that like reference numerals denote the same or corresponding portions in the drawings and the description thereof is not repeated.

FIG. 1 is a schematic view that shows the configuration of a heat exchanging system 1 according to a first embodiment. As shown in FIG. 1, the heat exchanging system 1 includes a vapor compression refrigeration cycle 10. The vapor compression refrigeration cycle 10 is, for example, mounted on a vehicle in order to cool the cabin of the vehicle. Cooling using the vapor compression refrigeration cycle 10 is performed, for example, when a switch for cooling is turned on or when an automatic control mode in which the temperature in the cabin of the vehicle is automatically adjusted to a set temperature is selected and the temperature in the cabin is higher than the set temperature.

The vapor compression refrigeration cycle 10 includes a compressor 12, a heat exchanger 14 that serves as a first heat exchanger, a heat exchanger 15 that serves as a third heat exchanger, an expansion valve 16 that is an example of a first decompressor, and a heat exchanger 18 that serves as a second heat exchanger. The vapor compression refrigeration cycle 10 further includes an accumulator 40. The accumulator 40 is arranged in a path of refrigerant between the heat exchanger 18 and the compressor 12.

The compressor 12 is actuated by a motor or engine equipped for the vehicle as a power source, and adiabatically compresses refrigerant gas to obtain superheated refrigerant gas. The compressor 12 introduces and compresses gaseous refrigerant flowing from the heat exchanger 18 during operation of the vapor compression refrigeration cycle 10, and discharges high-temperature and high-pressure gaseous refrigerant to a refrigerant line 21. The compressor 12 discharges refrigerant to the refrigerant line 21 to thereby circulate refrigerant in the vapor compression refrigeration cycle 10.

The heat exchangers 14 and 15 cause superheated refrigerant gas, compressed in the compressor 12, to release heat to an external medium with a constant pressure and to become refrigerant liquid. High-pressure gaseous refrigerant discharged from the compressor 12 releases heat to the surroundings to be cooled in the heat exchangers 14 and 15 to thereby condense (liquefy). Each of the heat exchangers 14 and 15 includes tubes and fins. The tubes flow refrigerant. The fins are used to exchange heat between refrigerant flowing through the tubes and air around the heat exchanger 14 or 15.

Each of the heat exchangers 14 and 15 exchanges heat between refrigerant and outside air. Outside air may be supplied to the heat exchangers 14 and 15 by natural draft generated as the vehicle travels. Alternatively, outside air may be supplied to the heat exchangers 14 and 15 by forced draft from cooling fan, such as a condenser fan 42 and an engine cooling radiator fan. The condenser fan 42 rotates upon receiving driving force from a motor 44 to generate air stream to thereby supply outside air to the heat exchangers 14 and 15. Through heat exchange between cooling air and refrigerant in the heat exchangers 14 and 15, the temperature of refrigerant decreases, and refrigerant liquefies.

The expansion valve 16 causes high-pressure liquid refrigerant, flowing through a refrigerant line 25, to be sprayed through a small hole to expand into low-temperature and low-pressure atomized refrigerant. The expansion valve 16 decompresses refrigerant liquid, condensed in the heat exchangers 14 and 15, into wet steam in a gas-liquid mixing state. Note that a decompressor for decompressing refrigerant liquid is not limited to the expansion valve 16 that carries out throttle expansion; instead, the decompressor may be a capillary tube.

Atomized refrigerant flowing inside the heat exchanger 18 vaporizes to absorb heat of ambient air that is introduced so as to contact with the heat exchanger 18. The heat exchanger 18 uses low-temperature and low-pressure refrigerant decompressed by the expansion valve 16 to absorb heat of vaporization, required at the time when wet steam of refrigerant evaporates into refrigerant gas, from air-conditioning air flowing to the cabin of the vehicle to thereby cool the cabin of the vehicle. Air-conditioning air of which heat is absorbed by the heat exchanger 18 to decrease in temperature flows into the cabin of the vehicle to cool the cabin of the vehicle. Refrigerant absorbs heat from the surroundings to be heated in the heat exchanger 18.

The heat exchanger 18 includes tubes and fins. The tubes flow refrigerant. The fins are used to exchange heat between refrigerant flowing through the tubes and air around the heat exchanger 18. Refrigerant in a wet steam state flows through the tubes. When refrigerant flows through the tubes, the refrigerant absorbs heat of air-conditioning air as latent heat of vaporization via the fins to evaporate, and further becomes superheated steam because of sensible heat. Vaporized refrigerant flows into the compressor 12 via refrigerant lines 28 and 29. The compressor 12 compresses refrigerant flowing from the heat exchanger 18.

The accumulator 40 is provided in order to keep the state of refrigerant introduced into the compressor 12 constant. The accumulator 40 has the function of, when refrigerant heated in the heat exchanger 18 is in a gas-liquid two-phase mixing state, separating refrigerant into gas and liquid, storing refrigerant liquid in the accumulator 40 and returning gaseous refrigerant in a saturated vapor state to the compressor 12. The accumulator 40 serves to introduce gaseous refrigerant steam into the compressor 12.

The vapor compression refrigeration cycle 10 further includes the refrigerant lines 21 and 22, refrigerant lines 23 and 24, the refrigerant line 25, refrigerant lines 26 and 27, the refrigerant line 28 and the refrigerant line 29. The refrigerant lines 21 and 22 provide fluid communication between the compressor 12 and the heat exchanger 14. The refrigerant lines 23 and 24 provide fluid communication between the heat exchanger 14 and the heat exchanger 15. The refrigerant line 25 provides fluid communication between the heat exchanger 15 and the expansion valve 16. The refrigerant lines 26 and 27 provide fluid communication between the expansion valve 16 and the heat exchanger 18. The refrigerant line 28 provides fluid communication between the heat exchanger 18 and the accumulator 40. The refrigerant line 29 provides fluid communication between the accumulator 40 and the compressor 12.

The refrigerant lines 21 and 22 are lines for flowing refrigerant from the compressor 12 to the heat exchanger 14. Refrigerant flows from the outlet of the compressor 12 toward the inlet of the heat exchanger 14 between the compressor 12 and the heat exchanger 14 via the refrigerant lines 21 and 22. The refrigerant lines 23 to 25 are lines for flowing refrigerant from the heat exchanger 14 to the expansion valve 16. Refrigerant flows from the outlet of the heat exchanger 14 toward the inlet of the expansion valve 16 between the heat exchanger 14 and the expansion valve 16 via the refrigerant lines 23 to 25.

The refrigerant lines 26 and 27 are lines for flowing refrigerant from the expansion valve 16 to the heat exchanger 18. Refrigerant flows from the outlet of the expansion valve 16 toward the inlet of the heat exchanger 18 between the expansion valve 16 and the heat exchanger 18 via the refrigerant lines 26 and 27. The refrigerant lines 28 and 29 are lines for flowing refrigerant from the heat exchanger 18 to the compressor 12. Refrigerant flows from the outlet of the heat exchanger 18 toward the inlet of the compressor 12 between the heat exchanger 18 and the compressor 12 via the refrigerant lines 28 and 29.

The vapor compression refrigeration cycle 10 is formed such that the compressor 12, the heat exchangers 14 and 15, the expansion valve 16 and the heat exchanger 18 are coupled by the refrigerant lines 21 to 29. Note that refrigerant used in the vapor compression refrigeration cycle 10 may be, for example, carbon dioxide, hydrocarbon, such as propane and isobutane, ammonia, chlorofluorocarbons, water, or the like.

The path through which refrigerant flows from the outlet of the heat exchanger 14 toward the inlet of the expansion valve 16 includes the refrigerant line 23, the refrigerant line 24 and the refrigerant line 25. The refrigerant line 23 is routed from the outlet side of the heat exchanger 14 to a flow regulating valve 38 (described later). The refrigerant line 24 is coupled to the inlet side of the heat exchanger 15. The refrigerant line 25 flows refrigerant from the outlet side of the heat exchanger 15 to the expansion valve 16.

The path of refrigerant that flows between the heat exchanger 14 and the heat exchanger 15 includes a refrigerant line 33, a refrigerant line 34 and a refrigerant line 36. The refrigerant line 33 is branched off from the refrigerant line 23 and is routed to a cooling portion 30 (described later). The refrigerant line 34 provides fluid communication between the cooling portion 30 and a selector valve 52 (described later). The refrigerant line 36 provides fluid communication between the selector valve 52 and the refrigerant line 24. Refrigerant liquid flows from the heat exchanger 14 to the cooling portion 30 via the refrigerant line 33. Refrigerant passing through the cooling portion 30 returns to the refrigerant line 23 via the refrigerant lines 34 and 36. The cooling portion 30 is provided in the path of refrigerant flowing from the heat exchanger 14 toward the heat exchanger 15.

The heat exchanging system 1 includes a path of refrigerant, connected in parallel with the refrigerant lines 23 and 24 between the heat exchangers 14 and 15, and the cooling portion 30 is provided in this path of refrigerant. The cooling portion 30 is provided in one of the plurality of parallel connected paths of refrigerant flowing between the heat exchanger 14 and the heat exchanger 15. The cooling portion 30 includes a hybrid vehicle (HV) device 31 and a cooling line 32. The HV device 31 is an electrical device mounted on the vehicle. The cooling line 32 is a line through which refrigerant flows. The HV device 31 is an example of a heat generating source. One end portion of the cooling line 32 is connected to the refrigerant line 33. The other end portion of the cooling line 32 is connected to the refrigerant line 34.

The path of refrigerant, connected in parallel with the refrigerant lines 23 and 24, includes the refrigerant line 33 on the upstream side (side closer to the heat exchanger 14) of the cooling portion 30, the cooling line 32 included in the cooling portion 30, and the refrigerant lines 34 and 36 on the downstream side (side closer to the heat exchanger 15) of the cooling portion 30. The refrigerant line 33 is a line that is branched off from the refrigerant line 23 and that is used to flow liquid refrigerant from the heat exchanger 14 to the cooling portion 30. The refrigerant lines 34 and 36 are lines that return refrigerant from the cooling portion 30 to the refrigerant line 24 and that are used to flow refrigerant to the heat exchanger 15.

Refrigerant liquid flowing out from the heat exchanger 14 flows toward the cooling portion 30 via the refrigerant lines 23 and 33. Refrigerant that flows to the cooling portion 30 and that flows via the cooling line 32 takes heat from the HV device 31, which serves as the heat generating source, to cool the HV device 31. The cooling portion 30 cools the HV device 31 by using liquid refrigerant that is condensed in the heat exchanger 14 and that flows to the cooling line 32. Refrigerant flowing through the cooling line 32 exchanges heat with the HV device 31 in the cooling portion 30 to cool the HV device 31, and the refrigerant is heated. Refrigerant further flows from the cooling portion 30 via the refrigerant lines 34 and 36, and reaches the heat exchanger 15 via the refrigerant line 24.

The cooling portion 30 is configured to be able to exchange heat between the HV device 31 and refrigerant in the cooling line 32. In the present embodiment, the cooling portion 30, for example, has the cooling line 32 that is formed such that the outer periphery of the cooling line 32 is in direct contact with the casing of the HV device 31. The cooling line 32 has a portion adjacent to the casing of the HV device 31. At that portion, heat is exchangeable between refrigerant, flowing through the cooling line 32, and the HV device 31.

The HV device 31 is directly connected to the outer periphery of the cooling line 32 that forms part of the path of refrigerant, routed from the heat exchanger 14 to the heat exchanger 15 in the vapor compression refrigeration cycle 10, and is cooled. The HV device 31 is arranged on the outside of the cooling line 32, so the HV device 31 does not interfere with flow of refrigerant flowing inside the cooling line 32. Therefore, the pressure loss of the vapor compression refrigeration cycle 10 does not increase, so the HV device 31 may be cooled without increasing the power of the compressor 12.

Alternatively, the cooling portion 30 may include a selected known heat pipe that is interposed between the HV device 31 and the cooling line 32. In this case, the HV device 31 is connected to the outer periphery of the cooling line 32 via the heat pipe, and heat is transferred from the HV device 31 to the cooling line 32 via the heat pipe to thereby cool the HV device 31. The HV device 31 serves as a heating portion for heating the heat pipe, and the cooling line 32 serves as a cooling portion for cooling the heat pipe to thereby increase the heat-transfer efficiency between the cooling line 32 and the HV device 31, so it is possible to improve the cooling efficiency of the HV device 31. For example, a Wick heat pipe may be used.

The heat pipe is able to reliably transfer heat from the HV device 31 to the cooling line 32, so there may be a distance between the HV device 31 and the cooling line 32, and complex arrangement of the cooling line 32 is not required to bring the cooling line 32 into contact with the HV device 31. As a result, it is possible to improve the flexibility of arrangement of the HV device 31.

The HV device 31 includes an electrical device that exchanges electric power to generate heat. The electrical device includes at least any one of, for example, an inverter used to convert direct-current power to alternating-current power, a motor generator that is a rotating electrical machine, a battery that is an electrical storage device, a step-up converter that is used to step up the voltage of the battery and a DC/DC converter that is used to step down the voltage of the battery.

Refrigerant passes through a refrigerant circulation path that is formed by sequentially connecting the compressor 12, the heat exchangers 14 and 15, the expansion valve 16 and the heat exchanger 18 by the refrigerant lines 21 to 29 to circulate in the vapor compression refrigeration cycle 10. Refrigerant flows in the vapor compression refrigeration cycle 10 so as to sequentially pass through points A, B, C, D, E and F shown in FIG. 1, and refrigerant circulates among the compressor 12, the heat exchangers 14 and 15, the expansion valve 16 and the heat exchanger 18.

Figure 2:
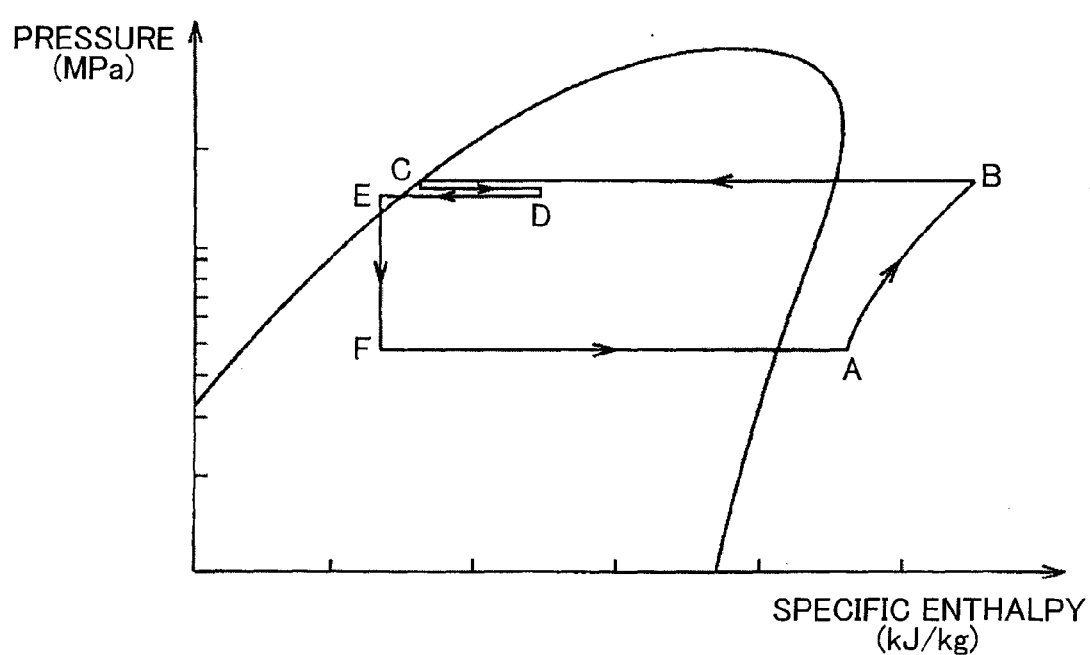
FIG. 2 is a Mollier chart that shows the state of refrigerant in an air-conditioner operation mode.

FIG. 2 is a Mollier chart that shows the state of refrigerant in the vapor compression refrigeration cycle 10. In FIG. 2, the abscissa axis represents the specific enthalpy of refrigerant, and the ordinate axis represents the absolute pressure of refrigerant. The unit of the specific enthalpy is kJ/kg, and the unit of the absolute pressure is MPa. The curve in the chart is the saturation vapor line and saturation liquid line of refrigerant.

FIG. 2 shows the thermodynamic state of refrigerant at points (that is, points A, B, C, D, E and F) in the vapor compression refrigeration cycle 10 when refrigerant flows from the refrigerant line 23 at the outlet of the heat exchanger 14 into the cooling portion 30 via the refrigerant line 33, cools the HV device 31 and returns from the cooling portion 30 to the refrigerant line 24 at the inlet of the heat exchanger 15 via the refrigerant lines 34 and 36.

As shown in FIG. 2, refrigerant (point A) in a superheated steam state, introduced into the compressor 12, is adiabatically compressed in the compressor 12 along a constant specific entropy line. As refrigerant is compressed, the refrigerant increases in pressure and temperature into high-temperature and high-pressure superheated steam having a high degree of superheat (point B).

High-temperature and high-pressure refrigerant in a superheated steam state, adiabatically compressed in the compressor 12, flows to the heat exchanger 14 and is cooled in the heat exchanger 14. Gaseous refrigerant discharged from the compressor 12 releases heat to the surroundings to be cooled in the heat exchanger 14 to thereby condense (liquefy). Through heat exchange with outside air in the heat exchanger 14, the temperature of refrigerant decreases, and refrigerant liquefies. High-pressure refrigerant steam in the heat exchanger 14 becomes dry saturated steam from superheated steam with a constant pressure in the heat exchanger 14, releases latent heat of condensation to gradually liquefy into wet steam in a gas-liquid mixing state, and becomes saturated liquid as the entire refrigerant condenses (point C).

Refrigerant in a saturated liquid state, flowing out from the heat exchanger 14, flows to the cooling line 32 of the cooling portion 30 via the refrigerant lines 23 and 33, and cools the HV device 31. In the cooling portion 30, heat is released to liquid refrigerant in a saturated liquid state, which is condensed as it passes through the heat exchanger 14, to thereby cool the HV device 31. Refrigerant is heated by exchanging heat with the HV device 31, and the dryness of the refrigerant increases. Refrigerant receives latent heat from the HV device 31 to partially vaporize into wet steam in a gas-liquid two-phase state, which mixedly contains saturated liquid and saturated steam (point D).

After that, refrigerant flows into the heat exchanger 15 via the refrigerant lines 34, 36 and 24. Wet steam of refrigerant exchanges heat with outside air in the heat exchanger 15 to be cooled to thereby condense again, becomes saturated liquid as the entire refrigerant condenses, and further releases sensible heat to become supercooled liquid (point E). After that, refrigerant flows into the expansion valve 16 via the refrigerant line 25. In the expansion valve 16, refrigerant in a supercooled liquid state is throttle-expanded, and the refrigerant decreases in temperature and pressure with the specific enthalpy unchanged to become low-temperature and low-pressure wet steam in a gas-liquid mixing state (point F).

Refrigerant in a wet steam state from the expansion valve 16 flows into the heat exchanger 18 via the refrigerant lines 26 and 27. Refrigerant in a wet steam state flows into the tubes of the heat exchanger 18. When refrigerant flows through the tubes of the heat exchanger 18, the refrigerant absorbs heat of air-conditioning air as latent heat of vaporization via the fins to evaporate with a constant pressure. The heat exchanger 18 is arranged inside a duct through which air-conditioning air flows, and exchanges heat between refrigerant and air-conditioning air to adjust the temperature of air-conditioning air. Air-conditioning air may be outside air or may be air in the cabin of the vehicle. During cooling operation, air-conditioning air is cooled in the heat exchanger 18, and refrigerant receives heat transferred from air-conditioning air to be heated.

As the entire refrigerant becomes dry saturated steam, the refrigerant steam further increases in temperature by sensible heat to become superheated steam (point A). After that, refrigerant is introduced into the compressor 12 via the refrigerant lines 28 and 29. The compressor 12 compresses refrigerant flowing from the heat exchanger 18.

Refrigerant continuously repeats changes among the compressed state, the condensed state, the throttle-expanded state and the evaporated state in accordance with the above-described cycle. Note that, in the above description of the vapor compression refrigeration cycle, a theoretical refrigeration cycle is described; however, in the actual vapor compression refrigeration cycle 10, it is, of course, necessary to consider a loss in the compressor 12, a pressure loss of refrigerant and a heat loss.

During operation of the vapor compression refrigeration cycle 10, refrigerant absorbs heat of vaporization from air in the cabin of the vehicle at the time when the refrigerant evaporates in the heat exchanger 18 that serves as an evaporator to thereby cool the cabin. In addition, high-pressure liquid refrigerant from the heat exchanger 14 flows to the cooling portion 30 and exchanges heat with the HV device 31 to thereby cool the HV device 31. The heat exchanging system 1 cools the HV device 31, which is the heat generating source mounted on the vehicle, by utilizing the vapor compression refrigeration cycle 10 for air-conditioning the cabin of the vehicle. Note that the temperature required to cool the HV device 31 is desirably at least lower than the upper limit of a target temperature range of the HV device 31.

The vapor compression refrigeration cycle 10 that is provided in order to cool a cooled portion in the heat exchanger 18 is utilized to cool the HV device 31, so it is not necessary to provide a device, such as an exclusive water circulation pump and a cooling fan, in order to cool the HV device 31. Therefore, it is possible to reduce components required to cool the HV device 31 and to simplify the system configuration, so it is possible to reduce the manufacturing cost of the heat exchanging system 1. In addition, it is not necessary to operate a power source, such as a pump and a cooling fan, in order to cool the HV device 31, and power consumption for operating the power source is not required. Thus, it is possible to reduce power consumption for cooling the HV device 31.

In the heat exchanger 14, refrigerant just needs to be cooled into a saturated liquid state, and refrigerant liquid in a saturated liquid state is supplied to the cooling portion 30. Refrigerant in a wet steam state, which receives latent heat of vaporization from the HV device 31 to be partially vaporized, is cooled again in the heat exchanger 15. Refrigerant changes in state at a constant temperature until the refrigerant in a wet steam state completely condenses into saturated liquid. The heat exchanger 15 further supercools liquid refrigerant to a degree of supercooling required to cool the cabin of the vehicle. A degree of supercooling of refrigerant does not need to be excessively increased, so the capacity of each of the heat exchangers 14 and 15 may be reduced. Thus, it is possible to ensure the cooling performance for cooling the cabin, and it is possible to reduce the size of each of the heat exchangers 14 and 15, so it is possible to obtain the heat exchanging system 1 that is reduced in size and that is advantageous in installation on the vehicle.

The refrigerant lines 23 and 24 that do not pass through the cooling portion 30 and the refrigerant lines 33, 34 and 36 and cooling line 32 that form the path of refrigerant passing through the cooling portion 30 to cool the HV device 31 are provided in parallel with each other as the paths through which refrigerant flowing from the heat exchanger 14 toward the expansion valve 16. The cooling system for cooling the HV device 31, including the refrigerant lines 33, 34 and 36, is connected in parallel with the refrigerant lines 23 and 24. Therefore, only part of refrigerant flowing out from the heat exchanger 14 flows to the cooling portion 30. The amount of refrigerant required to cool the HV device 31 is caused to flow to the cooling portion 30, and the HV device 31 is appropriately cooled. Thus, it is possible to prevent excessive cooling of the HV device 31.

The path of refrigerant that flows from the heat exchanger 14 to the heat exchanger 15 without passing through the cooling portion 30 and the path of refrigerant that flows from the heat exchanger 14 to the heat exchanger 15 via the cooling portion 30 are provided in parallel with each other, and only part of refrigerant is caused to flow to the refrigerant lines 33, 34 and 36. By so doing, it is possible to reduce the pressure loss at the time when refrigerant flows through the cooling system for cooling the HV device 31. Not the entire refrigerant flows to the cooling portion 30. Therefore, it is possible to reduce the pressure loss associated with flow of refrigerant via the cooling portion 30, and, accordingly, it is possible to reduce power consumption required to operate the compressor 12 for circulating refrigerant.

When low-temperature and low-pressure refrigerant after passing through the expansion valve 16 is used to cool the HV device 31, the cooling performance of air in the cabin in the heat exchanger 18 reduces and the cooling performance for cooling the cabin decreases. In contrast to this, in the heat exchanging system 1 according to the present embodiment, in the vapor compression refrigeration cycle 10, high-pressure refrigerant discharged from the compressor 12 is condensed by both the heat exchanger 14 that serves as a first condenser and the heat exchanger 15 that serves as a second condenser. The two-stage heat exchangers 14 and 15 are arranged between the compressor 12 and the expansion valve 16, and the cooling portion 30 for cooling the HV device 31 is provided between the heat exchanger 14 and the heat exchanger 15. The heat exchanger 15 is provided in the path of refrigerant flowing from the cooling portion 30 toward the expansion valve 16.

By sufficiently cooling refrigerant, which receives latent heat of vaporization from the HV device 31 to be heated, in the heat exchanger 15, the refrigerant has a temperature and a pressure that are originally required to cool the cabin of the vehicle at the outlet of the expansion valve 16. Therefore, it is possible to sufficiently increase the amount of heat externally received when refrigerant evaporates in the heat exchanger 18, so it is possible to sufficiently cool air-conditioning air that passes through the heat exchanger 18. In this way, by setting the heat radiation performance for the heat exchanger 15 so as to be able to sufficiently cool refrigerant, the HV device 31 may be cooled without any influence on the cooling performance for cooling the cabin. Thus, both the cooling performance for cooling the HV device 31 and the cooling performance for cooling the cabin may be reliably ensured.

When refrigerant flowing from the heat exchanger 14 to the cooling portion 30 cools the HV device 31, the refrigerant receives heat from the HV device 31 to be heated. As refrigerant is heated to a saturated steam temperature or above and the entire amount of the refrigerant vaporizes in the cooling portion 30, the amount of heat exchanged between the refrigerant and the HV device 31 reduces, and the HV device 31 cannot be efficiently cooled, and, in addition, pressure loss at the time when the refrigerant flows in the pipe increases. Therefore, it is desirable to sufficiently cool refrigerant in the heat exchanger 14 such that the entire amount of refrigerant does not vaporize after cooling the HV device 31.

Specifically, the state of refrigerant at the outlet of the heat exchanger 14 is brought close to saturated liquid, and, typically, refrigerant is placed in a state on the saturated liquid line at the outlet of the heat exchanger 14. Because the heat exchanger 14 is capable of sufficiently cooling refrigerant in this way, the heat radiation performance of the heat exchanger 14 for causing refrigerant to release heat is higher than the heat radiation performance of the heat exchanger 15. By sufficiently cooling refrigerant in the heat exchanger 14 having relatively high heat radiation performance, refrigerant that has received heat from the HV device 31 may be maintained in a wet steam state, and a reduction in the amount of heat exchanged between refrigerant and the HV device 31 may be avoided, so it is possible to sufficiently cool the HV device 31. Refrigerant in a wet steam state after cooling the HV device 31 is efficiently cooled again in the heat exchanger 15, and is cooled into a supercooled liquid state below a saturated temperature. Thus, it is possible to provide the heat exchanging system 1 that ensures both the cooling performance for cooling the cabin and the cooling performance for cooing the HV device 31.

Referring back to FIG. 1, the heat exchanging system 1 includes the flow regulating valve 38. The flow regulating valve 38 is connected to the refrigerant lines 23 and 24, which form one of the parallel connected paths of refrigerant from the heat exchanger 14 toward the expansion valve 16, not passing through the cooling portion 30. The flow regulating valve 38 changes its valve opening degree to increase or reduce the pressure loss of refrigerant flowing from the refrigerant line 23 to the refrigerant line 24 via the flow regulating valve 38. By so doing, the flow regulating valve 38 selectively adjusts the flow rate of refrigerant directly flowing from the refrigerant line 23 to the refrigerant line 24 and the flow rate of refrigerant flowing via the cooling system for cooing the HV device 31, including the cooling line 32.

For example, as the flow regulating valve 38 is fully closed to set the valve opening degree at 0%, the entire amount of refrigerant from the heat exchanger 14 flows into the cooling portion 30 via the refrigerant line 33. When the valve opening degree of the flow regulating valve 38 is increased, the flow rate of refrigerant that flows directly to the heat exchanger 15 via the refrigerant lines 23 increases and the flow rate of refrigerant that flows to the cooling line 32 via the refrigerant line 33 to cool the HV device 31 reduces within refrigerant that flows out from the heat exchanger 14. When the valve opening degree of the flow regulating valve 38 is reduced, the flow rate of refrigerant that directly flows to the heat exchanger 15 via the refrigerant lines 23 and 24 reduces and the flow rate of refrigerant that flows via the refrigerant line 33 to cool the HV device 31 increases within refrigerant that flows out from the heat exchanger 14.

As the valve opening degree of the flow regulating valve 38 is increased, the flow rate of refrigerant that cools the HV device 31 reduces, so cooling performance for cooling the HV device 31 decreases. As the valve opening degree of the flow regulating valve 38 reduces, the flow rate of refrigerant that cools the HV device 31 increases, so cooling performance for cooling the HV device 31 improves. The flow regulating valve 38 is used to make it possible to optimally adjust the amount of refrigerant flowing to the HV device 31, so it is possible to reliably prevent excessive cooling of the HV device 31, and, in addition, it is possible to reliably reduce pressure loss associated with flow of refrigerant in the cooling system for cooling the HV device 31 and the power consumption of the compressor 12 for circulating refrigerant.

The heat exchanging system 1 further includes a heat exchanging portion 60 that is connected in parallel with the heat exchanger 18. A path through which refrigerant flows from the expansion valve 16 toward the accumulator 40 includes a refrigerant line 63 and a refrigerant line 64. The refrigerant line 63 is a path of refrigerant flowing into the heat exchanging portion 60. The refrigerant line 64 is routed from the heat exchanging portion 60 to the accumulator 40. Part of refrigerant flowing inside the refrigerant line 26 adjacent to the outlet of the expansion valve 16 flows to the heat exchanger 18 via the refrigerant line 27, and the other part flows to the heat exchanging portion 60 via the refrigerant line 63.

The heat exchanging portion 60 includes a battery 61 and a heat exchanging line 62. The battery 61 is a storage battery mounted on the vehicle. The heat exchanging line 62 is a pipe through which refrigerant flows. The battery 61 that is an electrical storage device is a secondary battery, such as a lithium ion battery and a nickel metal hydride battery. A capacitor may be used instead of the battery. The battery 61 is included in the electrical device that exchanges electric power to generate heat. The battery 61 is an example of a temperature regulated portion of which the temperature is regulated by the heat exchanging system 1. One end portion of the heat exchanging line 62 is connected to the refrigerant line 63. The other end portion of the heat exchanging line 62 is connected to the refrigerant line 64.

A flow dividing valve 66 is provided in the path of refrigerant, routed from the expansion valve 16 to the heat exchanger 18. The flow dividing valve 66 is arranged at a branching point between the refrigerant line 27 and the refrigerant line 63. The refrigerant line 27 is a path of refrigerant flowing to the heat exchanger 18. The refrigerant line 63 is a path of refrigerant flowing to the heat exchanging portion 60. The flow dividing valve 66 functions as a flow regulating valve that regulates the flow rate of refrigerant flowing from the refrigerant line 26 to the heat exchanger 18 via the refrigerant line 27 and the flow rate of refrigerant flowing from the refrigerant line 26 to the heat exchanging portion 60 via the refrigerant line 63.

The path of refrigerant between the flow dividing valve 66 and the accumulator 40 includes the refrigerant line 63 on the upstream side (side closer to the flow dividing valve 66) of the heat exchanging portion 60, the heat exchanging line 62 included in the heat exchanging portion 60, and the refrigerant line 64 on the downstream side (side adjacent to the accumulator 40) of the heat exchanging portion 60. The refrigerant line 63 is a line through which refrigerant flows from the flow dividing valve 66 to the heat exchanging portion 60. The refrigerant line 64 is a line through which refrigerant flows from the heat exchanging portion 60 to the accumulator 40.

Refrigerant flowing to the heat exchanging portion 60 and flowing via the heat exchanging line 62 exchanges heat with the battery 61 that serves as the temperature regulated portion to cool or heat the battery 61. The heat exchanging portion 60 regulates the temperature of the battery 61 by using refrigerant flowing to the heat exchanging line 62 via the refrigerant line 63. In the heat exchanging portion 60, when the battery 61 is cooled, refrigerant flowing inside the heat exchanging line 62 takes heat from the battery 61, so the battery 61 is cooled, and refrigerant is heated. In the heat exchanging portion 60, when the battery 61 is heated, heat is transferred from refrigerant flowing inside the heat exchanging line 62 to the battery 61, so the battery 61 is heated, and refrigerant is cooled.

The heat exchanging portion 60, as well as the above-described cooling portion 30, is configured to be able to exchange heat between refrigerant, flowing through the heat exchanging line 62, and the battery 61. The heat exchanging portion 60 may be formed such that the outer periphery of the heat exchanging line 62 directly contacts the casing of the battery 61 or the heat exchanging portion 60 may include a selected known heat pipe that is interposed between the battery 61 and the heat exchanging line 62.

The heat exchanging system 1 further includes a bypass passage 71. The bypass passage 71 provides fluid communication between the refrigerant line 21 and the refrigerant line 26. The refrigerant line 21 is a path of refrigerant between the compressor 12 and the heat exchanger 14. The refrigerant line 26 is a path of refrigerant between the expansion valve 16 and the heat exchanger 18. The bypass passage 71 is a path that bypasses the heat exchangers 14 and 15 and the expansion valve 16 and that is used to flow refrigerant from the compressor 12 to the heat exchanger 18 and/or the heat exchanging portion 60 without passing through the heat exchangers 14 and 15 and the expansion valve 16.

A selector valve 72 is provided at a branching point between the bypass passage 71 and the refrigerant lines 21 and 22. The selector valve 72 allows or interrupts flow of refrigerant passing through the bypass passage 71. The selector valve 72 is provided as a three-way valve that has three pipe connection ports. The refrigerant line 21 is connected to the first pipe connection port of the selector valve 72. The refrigerant line 22 is connected to the second pipe connection port of the selector valve 72. The bypass passage 71 is connected to the third pipe connection port of the selector valve 72. The selector valve 72 switches a fluid communication state between the refrigerant line 21 and the bypass passage 71. The bypass passage 71 connects the selector valve 72 with the refrigerant line 26. The selector valve 72 is provided between the compressor 12 and the heat exchanger 14. The refrigerant line 26 is a path of refrigerant between the expansion valve 16 and the heat exchanger 18.

The selector valve 72 switches between the open state and the closed state to thereby switch between flow of refrigerant from the refrigerant line 21 toward the refrigerant line 22 and flow of refrigerant from the refrigerant line 21 toward the bypass passage 71. The selector valve 72 functions as a path selecting unit that selectively switches between flow of refrigerant from the compressor 12 toward the heat exchanger 14 and flow of refrigerant from the compressor 12 toward the heat exchanger 18 and/or the heat exchanging portion 60 via the bypass passage 71. By changing the path of refrigerant with the use of the selector valve 72, it is possible to cause high-temperature refrigerant adiabatically compressed by the compressor 12 to flow to any selected one of the paths, that is, a path to the heat exchanger 14 via the refrigerant line 22 and a path to the heat exchanger 18 and/or the heat exchanging portion 60 via the bypass passage 71.

The heat exchanging system 1 further includes an expansion valve 76 that is provided in the bypass passage 71. The expansion valve 76 functions as a second decompressor different from the expansion valve 16 that serves as the first decompressor. The expansion valve 76 decompresses refrigerant flowing through the bypass passage 71. The second decompressor does not need to have an opening degree adjustment function, and a thin capillary tube may be provided instead of the expansion valve 76. The expansion valve 76 throttle-expands refrigerant flowing through the bypass passage 71 to decrease the pressure of refrigerant. By so doing, refrigerant flowing downstream of the expansion valve 76 is lower in pressure than refrigerant flowing upstream of the expansion valve 76 in the bypass passage 71.

A check valve 74 is provided in the refrigerant line 26. The check valve 74 is provided in the refrigerant line 26 at a portion adjacent to the expansion valve 16 with respect to a coupling point of the refrigerant line 26 with the bypass passage 71. The check valve 74 prohibits flow of refrigerant from the bypass passage 71 toward the expansion valve 16. The check valve 74 is provided in order to cause the entire refrigerant flowing from the bypass passage 71 to the refrigerant line 26 to flow toward the flow dividing valve 66 and causes refrigerant to reliably flow from the bypass passage 71 to at least any one of the heat exchanger 18 and the heat exchanging portion 60 via the flow dividing valve 66.

The heat exchanging system 1 further includes a communication line 51. The communication line 51 provides fluid communication between the refrigerant line 22 and the refrigerant lines 34 and 36. Refrigerant flows through the refrigerant line 22 between the compressor 12 and the heat exchanger 14. The refrigerant lines 34 and 36 are located on the downstream side of the cooling portion 30 among the refrigerant lines 33, 34 and 36 for flowing refrigerant to the cooling portion 30.

The selector valve 52 is provided at a coupling point among the refrigerant lines 34 and 36 and the communication line 51, and changes a fluid communication state among the communication line 51 and the refrigerant lines 34 and 36. The selector valve 52 is provided as a three-way valve that has three pipe connection ports. The refrigerant line 34 is connected to the first pipe connection port of the selector valve 52. The refrigerant line 36 is connected to the second pipe connection port of the selector valve 52. The communication line 51 is connected to the third pipe connection port of the selector valve 52.

The selector valve 52 switches between the open state and the closed state to thereby allow or interrupt flow of refrigerant via the communication line 51. By switching the path of refrigerant using the selector valve 52, refrigerant after cooling the HV device 31 may be caused to flow to any selected one of the paths, that is, a path to the heat exchanger 15 via the refrigerant lines 34, 36 and 24 and a path to the heat exchanger 14 via the communication line 51 and the refrigerant line 22.

FIG. 3 is a table that shows settings of the compressor 12 and valves in each operation mode of the heat exchanging system 1. FIG. 3 shows settings of the operating condition of the compressor 12 and the opening degrees of the flow regulating valve 38, selector valve 52, flow dividing valve 66 and selector valve 72 in each operation mode in the case where the heat exchanging system 1 is operated in any one of different five operation modes. FIG. 3 further shows the temperature regulating action of refrigerant on the HV device 31 and the battery 61, the operating state of the vehicle and the state of air conditioning in the cabin with the use of an air conditioner in each operation mode of the heat exchanging system 1.

An "air-conditioner operation mode" among the operation modes shown in FIG. 3 is the operation mode described above with reference to FIG. 1 and FIG. 2, and is the operation mode in which the vehicle is operating, the air conditioner for cooling the cabin of the vehicle is in operation and cooling of the HV device 31 and cooling of the battery 61 are desired. Note that, in FIG. 1, and FIG. 4, FIG.

6, FIG. 8 and FIG. 9 (described later), refrigerant flows through the paths of refrigerant indicated by the solid line, and no refrigerant flows through the paths of refrigerant indicated by the dashed line.

In the "air-conditioner operation mode", it is required to cause refrigerant to flow through the whole of the vapor compression refrigeration cycle 10, including the expansion valve 16 and the heat exchanger 18, in order to cool the vehicle cabin, so the compressor 12 is operated. The valve opening degree of the flow regulating valve 38 is adjusted such that a sufficient amount of refrigerant flows to the cooling portion 30 in order to cool the HV device 31. The selector valve 52 is switched such that the refrigerant line 34 and the refrigerant line 36 are in fluid communication with each other and the communication line 51 is not in fluid communication with both the refrigerant lines 34 and 36.

The flow dividing valve 66 controls the flow rate of refrigerant flowing to the heat exchanger 18 and the flow rate of refrigerant flowing to the heat exchanging portion 60 in response to a request for cooling performance for cooling the vehicle cabin and cooling performance for cooling the battery 61. The open/close state of the selector valve 72 is switched such that the refrigerant line 21 and the refrigerant line 22 are in fluid communication with each other and the bypass passage 71 is not in fluid communication with both the refrigerant lines 21 and 22.

Refrigerant is caused to circulate in the vapor compression refrigeration cycle 10, and heat is taken from the HV device 31 due to latent heat of vaporization of refrigerant flowing from the heat exchanger 14 to the cooling portion 30, so it is possible to efficiently cool the HV device 31. In addition, it is possible to cool air-conditioning air by supplying the heat exchanger 18 with refrigerant adjusted into a low-temperature and low-pressure atomized state by the expansion valve 16, so it is possible to ensure cooling performance for cooling the vehicle cabin. Furthermore, it is possible to efficiently cool the battery 61 by supplying the heat exchanging portion 60 with refrigerant adjusted into a low-temperature low-pressure state by the expansion valve 16.

Figure 4:
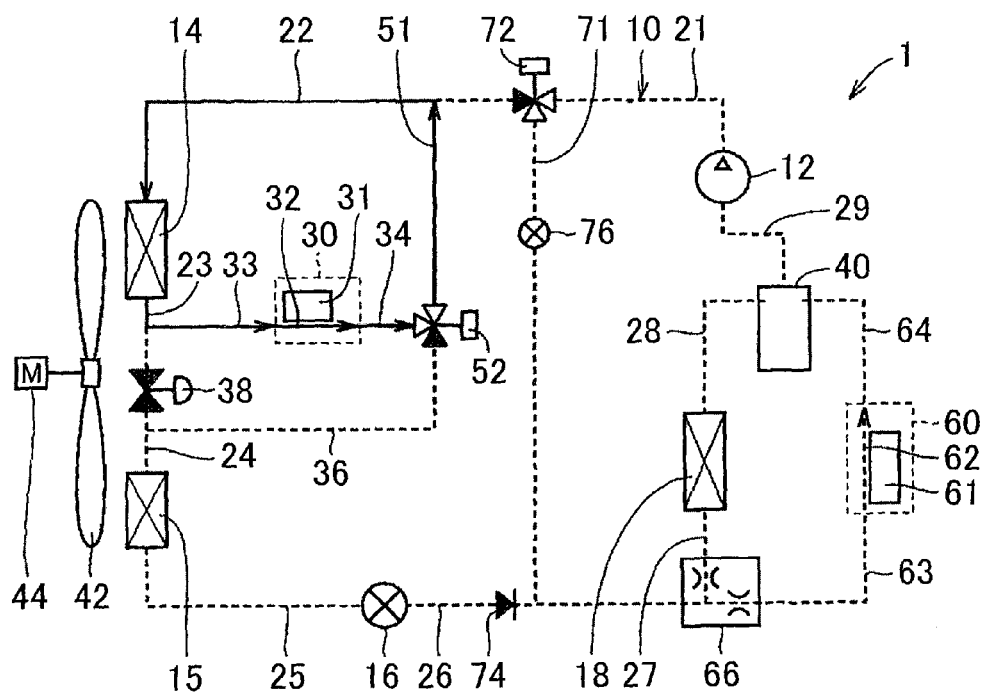
FIG. 4 is a schematic view that shows the operation of the heat exchanging system in an air-conditioner stop mode.
Figure 5:
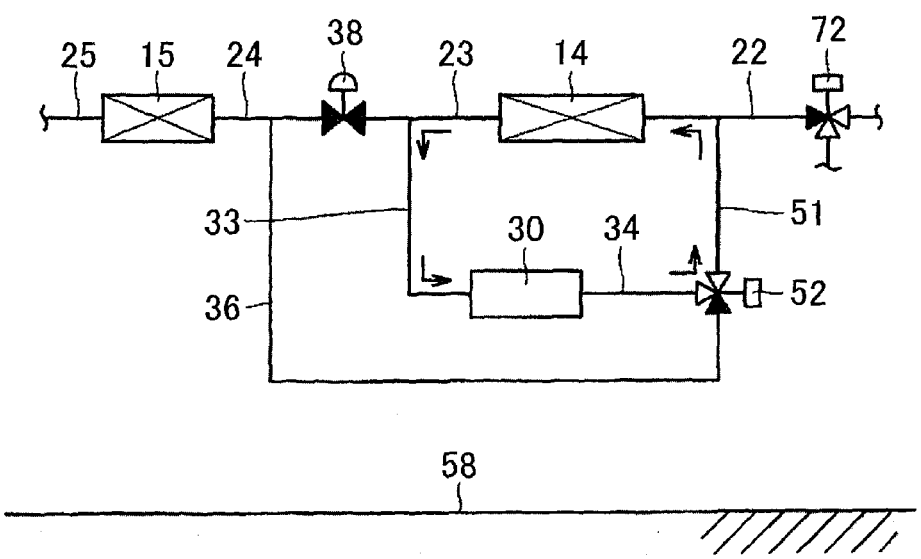
FIG. 5 is a schematic view that shows the configuration of part of the heat exchanging system shown in FIG. 4.

FIG. 4 is a schematic view that shows the operation of the heat exchanging system 1 in an air-conditioner stop mode. FIG. 5 is a schematic view that shows part of the configuration of the heat exchanging system 1 shown in FIG. 4. The "air-conditioner stop mode" among the operation modes shown in FIG. 3 is an operation mode in which, during operation or stop of the vehicle, the air conditioner for air-conditioning the vehicle cabin is stopped, but cooling of the HV device 31 is required as shown in FIG. 4 and FIG. 5. At this time, cooling of the battery 61 is not required.

In the "air-conditioner stop mode", the vapor compression refrigeration cycle 10 is stopped, and it is not required to cause refrigerant to flow through the whole of the vapor compression refrigeration cycle 10, so the compressor 12 is stopped. The flow regulating valve 38 is fully closed. By so doing, the entire refrigerant flowing through the refrigerant line 23 at the outlet of the heat exchanger 14 flows to the cooling portion 30, and refrigerant does not flow from the refrigerant line 23 to the refrigerant line 24 via the flow regulating valve 38. The selector valve 52 is switched such that the refrigerant line 34 and the communication line 51 are in fluid communication with each other and the refrigerant line 36 is not in fluid communication with both the refrigerant line 34 and the communication line 51. The selector valve 52 is operated so as to circulate refrigerant from the cooling portion 30 to the heat exchanger 14. Refrigerant does not flow from the refrigerant line 34 to the refrigerant line 36 but flows via the communication line 51.

Because refrigerant does not flow to the flow dividing valve 66, the flow dividing valve 66 is selectively set. The open/close state of the selector valve 72 is switched such that both the refrigerant line 21 and the bypass passage 71 are not in fluid communication with the refrigerant line 22. By so setting the selector valve 72, refrigerant flowing from the communication line 51 to the refrigerant line 22 is prohibited from flowing to the refrigerant line 21 or the bypass passage 71 via the selector valve 72, and the entire refrigerant flowing through the communication line 51 flows to the heat exchanger 14.

By so doing, a closed annular path that is routed from the heat exchanger 14 to the cooling portion 30 via the refrigerant lines 23 and 33, further passes through the refrigerant line 34, the selector valve 52, the communication line 51 and the refrigerant line 22 sequentially and returns to the heat exchanger 14 is formed. By so doing, it is possible to cause refrigerant flowing through the refrigerant line 34 after cooling the HV device 31 to flow to the heat exchanger 14 via the communication line 51, thus making it possible to form an annular path that causes refrigerant to circulate between the cooling portion 30 and the heat exchanger 14 without passing through the compressor 12. The path of refrigerant is selected so as to cause refrigerant to circulate via an annular path that connects the cooling portion 30 with the heat exchanger 14.

Refrigerant may be circulated between the heat exchanger 14 and the cooling portion 30 via the annular path without operating the compressor 12. When refrigerant cools the HV device 31, the refrigerant receives latent heat of vaporization from the HV device 31 to evaporate. Refrigerant steam vaporized by exchanging heat with the HV device 31 flows to the heat exchanger 14 via the refrigerant line 34, the communication line 51 and the refrigerant line 22 sequentially. In the heat exchanger 14, refrigerant steam is cooled to condense by travelling wind of the vehicle or draft from the condenser fan 42 or the engine cooling radiator fan. Refrigerant liquid liquefied in the heat exchanger 14 returns to the cooling portion 30 via the refrigerant line 23 and the refrigerant line 33 sequentially.

In this way, a heat pipe in which the HV device 31 serves as a heating portion and the heat exchanger 14 serves as a cooling portion is formed by the annular path that passes through the cooling portion 30 and the heat exchanger 14. Thus, when the vapor compression refrigeration cycle 10 is stopped, that is, when a cooler for the vehicle is stopped as well, the HV device 31 may be reliably cooled without the necessity of start-up of the compressor 12. It is possible to cool the HV device 31 without using the power of the compressor 12, so it is not required to constantly operate the compressor 12 in order to cool the HV device 31. Therefore, it is possible to improve the fuel economy of the vehicle by reducing the power consumption of the compressor 12 and, in addition, it is possible to extend the life of the compressor 12, so it is possible to improve the reliability of the compressor 12.

FIG. 5 shows a ground 58. The cooling portion 30 is arranged below the heat exchanger 14 in the vertical direction perpendicular to the ground 58. In the annular path that circulates refrigerant between the heat exchanger 14 and the cooling portion 30, the cooling portion 30 is arranged below, and the heat exchanger 14 is arranged above. The heat exchanger 14 is arranged at the level higher than the cooling portion 30.

In this case, refrigerant steam heated and vaporized in the cooling portion 30 goes up in the annular path, reaches the heat exchanger 14, is cooled in the heat exchanger 14, condenses into liquid refrigerant, goes down in the annular path by the action of gravity and returns to the cooling portion 30. That is, a thermo-siphon heat pipe is formed of the cooling portion 30, the heat exchanger 14 and the paths of refrigerant that connect them. Because the heat transfer efficiency from the HV device 31 to the heat exchanger 14 may be improved by forming the heat pipe, when the vapor compression refrigeration cycle 10 is stopped as well, the HV device 31 may be further efficiently cooled without additional power.

Figure 6:
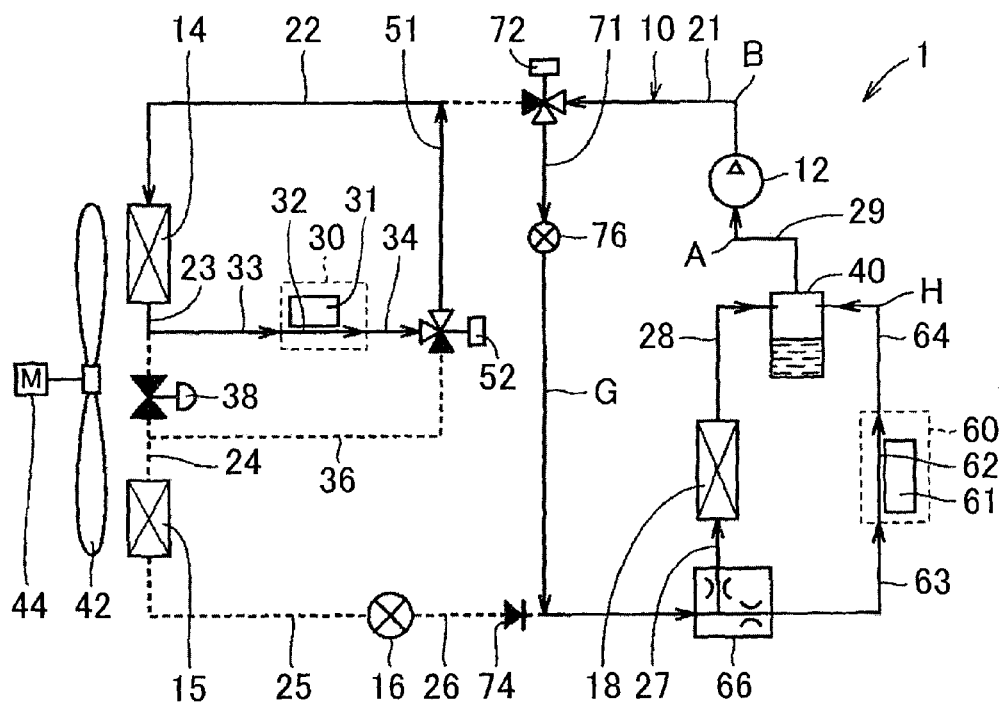
FIG. 6 is a schematic view that shows the operation of the heat exchanging system in a battery heating mode.

FIG. 6 is a schematic view that shows the operation of the heat exchanging system 1 in a battery heating mode. The "battery heating mode" among the operation modes shown in FIG. 3 is an operation mode in which heating of the battery 61 is required during operation or stop of the vehicle as shown in FIG. 6. At this time, the air conditioner for air-conditioning the vehicle cabin is in heating operation or stopped, and the HV device 31 generates heat as it executes charging control over the battery 61, so cooling is required.

In the "battery heating mode", in order to heat air-conditioning air in the heat exchanger 18 by flowing high-temperature refrigerant to the heat exchanger 18 and/or heat the battery 61 in the heat exchanging portion 60 by flowing high-temperature refrigerant to the heat exchanging portion 60, the compressor 12 is operated, and refrigerant is adiabatically compressed in the compressor 12 into a high-temperature high-pressure state. The flow regulating valve 38 is fully closed. By so doing, the entire refrigerant flowing through the refrigerant line 23 at the outlet of the heat exchanger 14 flows to the cooling portion 30. The selector valve 52 is switched such that the refrigerant line 34 and the communication line 51 are in fluid communication with each other and the refrigerant line 36 is not in fluid communication with both the refrigerant line 34 and the communication line 51.

The flow dividing, valve 66 controls the flow rate of refrigerant flowing to the heat exchanger 18 and the flow rate of refrigerant flowing to the heat exchanging portion 60 in response to a request for heating performance for heating the vehicle cabin and heating performance for heating the battery 61. The open/close state of the selector valve 72 is switched such that the refrigerant line 21 and the bypass passage 71 are in fluid communication with each other and both the refrigerant line 21 and the bypass passage 71 are not in fluid communication with the refrigerant line 22.

In this case, as in the case of the above-described "air-conditioner stop mode", the HV device 31 is cooled by the heat pipe in which the HV device 31 serves as the heating portion and the heat exchanger 14 serves as the cooling portion. Refrigerant adiabatically compressed in the compressor 12 flows from the refrigerant line 21 to the bypass passage 71 via the selector valve 72, and is throttle-expanded and reduced in pressure by the expansion valve 76 into a high-temperature low-pressure superheated steam state. The refrigerant in a superheated steam state further flows to the flow dividing valve 66 via the bypass passage 71 and the refrigerant line 26.

At least part of refrigerant is guided to the refrigerant line 63 by the flow dividing valve 66, and heat is exchanged between the battery 61 and refrigerant in the heat exchanging portion 60 to make it possible to heat the battery 61, so it is possible to ensure heating performance for heating the battery 61. In addition, when heating of the vehicle cabin is required, part of refrigerant is guided to the refrigerant line 27 by the flow dividing valve 66, and heat is exchanged between air-conditioning air for heating the vehicle cabin and refrigerant in the heat exchanger 18 to make it possible to heat air-conditioning air, so it is possible to ensure desired heating performance. When heating of the vehicle cabin is not required, refrigerant does not flow from the flow dividing valve 66 to the refrigerant line 27, and the entire refrigerant adiabatically compressed in the compressor 12 is used to heat the battery 61. When it is required to quickly heat the battery 61, in order to use the entire refrigerant to heat the battery 61 by giving a priority to heating of the battery 61, it is possible to set the open/close states of the flow dividing valve 66 such that the entire refrigerant is caused to flow to the refrigerant line 63.

Figure 7:
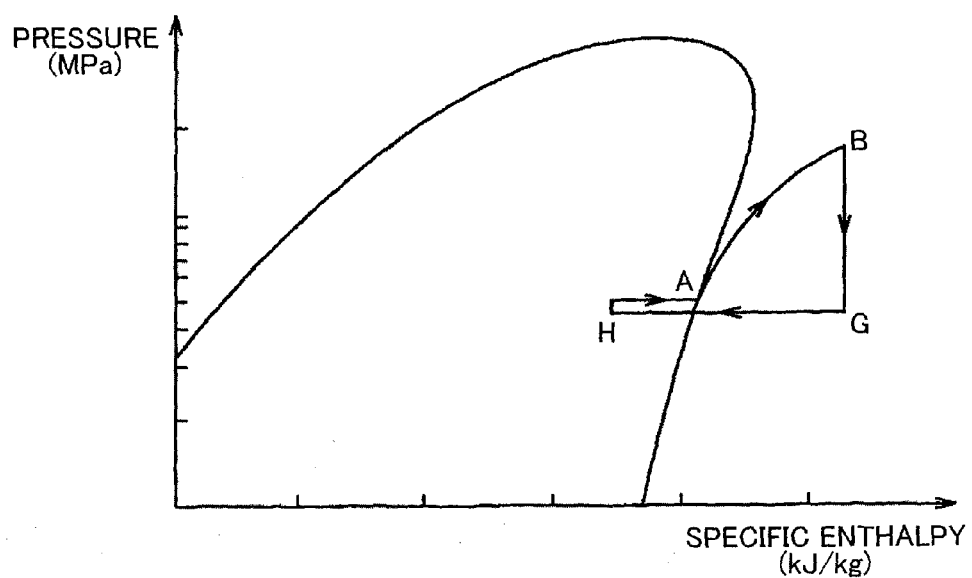
FIG. 7 is a Mollier chart that shows the state of refrigerant in the battery heating mode.

FIG. 7 is a Mollier chart that shows the state of refrigerant in the battery heating mode. In FIG. 7, the abscissa axis represents the specific enthalpy of refrigerant, and the ordinate axis represents the absolute pressure of refrigerant. The unit of the specific enthalpy is kJ/kg, and the unit of the absolute pressure is MPa. The curve in the chart is the saturation vapor line and saturation liquid line of refrigerant. FIG. 7 shows the thermodynamic state of refrigerant at points A, B, G and H shown in FIG. 6 when refrigerant flows from the compressor 12 into the heat exchanging portion 60 via the bypass passage 71 and cools the battery 61 in the heat exchanging portion 60.

As shown in FIG. 7, refrigerant is adiabatically compressed in the compressor 12 along a constant specific entropy line. As refrigerant is compressed, the refrigerant increases in pressure and temperature into high-temperature and high-pressure superheated steam having a high degree of superheat (point B). High-temperature and high-pressure refrigerant in a superheated steam state, adiabatically compressed in the compressor 12, flows into the expansion valve 76 provided in the bypass passage 71. In the expansion valve 76, refrigerant in a superheated steam state is throttle-expanded, and the refrigerant decreases in temperature and pressure with the specific enthalpy of the refrigerant unchanged to become low-pressure superheated steam (point G).

Refrigerant from the expansion valve 16 flows into the heat exchanging portion 60. When refrigerant passes through the heat exchanging line 62 of the heat exchanging portion 60, refrigerant releases sensible heat to reduce its specific enthalpy with a constant pressure and becomes dry saturated steam, and further releases latent heat of condensation to gradually liquefy into wet steam in a gas-liquid mixing state (point H). As heat released from refrigerant in the heat exchanging portion 60 is transferred to the battery 61, the battery 61 is heated.

Refrigerant that has exchanged heat with the battery 61 in the heat exchanging portion 60 flows into the accumulator 40. In this case, the accumulator 40 serves as a gas-liquid separator, and separates refrigerant in a gas-liquid two-phase state into gaseous refrigerant and liquid refrigerant. Refrigerant liquid that is liquid refrigerant is stored at the bottom side inside the accumulator 40. The refrigerant line 29 that serves as an outlet port of refrigerant from the accumulator 40 is coupled to the ceiling portion of the accumulator 40. Only refrigerant in a saturated steam state is delivered to the outside of the accumulator 40 via the refrigerant line 29. By so doing, the accumulator 40 is able to reliably separate gaseous refrigerant and liquid refrigerant from each other.

After that, refrigerant is introduced into the compressor 12 via the refrigerant line 29. The compressor 12 compresses refrigerant that flows from the accumulator 40. Refrigerant in a dry saturated steam state (point A) introduced into the compressor 12 is adiabatically compressed in the compressor 12 into a high-temperature high-pressure superheated steam state. Refrigerant continuously repeats changes among the compressed state, the throttle-expanded state and the condensed state in accordance with the above-described cycle.

By connecting the heat exchanging portion 60 for regulating the temperature of the battery 61 in parallel with the heat exchanger 18 for air-conditioning the vehicle cabin, it is possible to supply low-temperature low-pressure refrigerant throttle-expanded in the expansion valve 16 to the heat exchanging portion 60 and then cool the battery 61 as shown in FIG. 1. In addition, the bypass passage 71 and the selector valve 72 that allows flow of refrigerant to the bypass passage 71 are provided, and high-temperature refrigerant adiabatically compressed in the compressor 12 is supplied to the heat exchanging portion 60 via the bypass passage 71. By so doing, it is possible to heat the battery 61. Thus, it is possible to adjustably heat or cool the battery 61 with a further simple configuration, so it is possible to appropriately adjust the temperature of the battery 61.

During cooling and heating of the battery 61, flow of refrigerant to the cooling portion 30 is ensured, and the HV device 31 is constantly cooled in the cooling portion 30. Thus, it is possible to ensure the cooling performance of the HV device 31, and it is possible to prevent overheating of the HV device 31.

Figure 8:
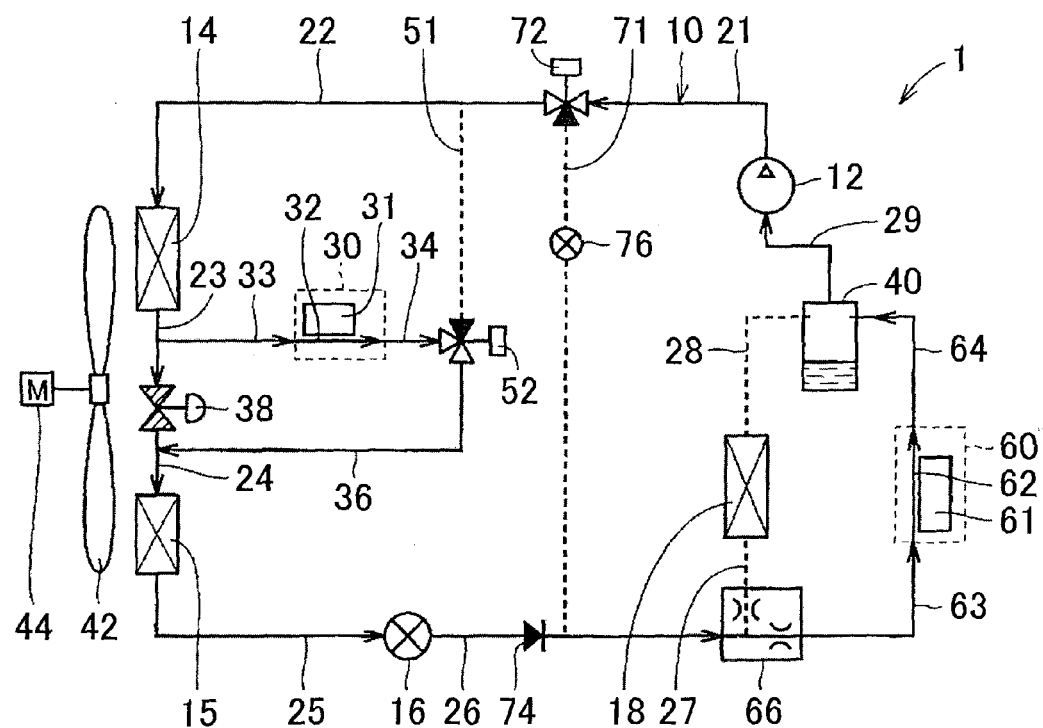
FIG. 8 is a schematic view that shows the operation of the heat exchanging system in a battery temperature control mode.

FIG. 8 is a schematic view that shows the operation of the heat exchanging system 1 in a battery temperature control mode. The "battery temperature control mode" among the operation modes shown in FIG. 3 is an operation mode in which, during operation or stop of the vehicle, the air conditioner for air-conditioning the vehicle cabin is stopped, but cooling of the battery 61 is required as shown in FIG. 8. The HV device 31 also generates heat, so the HV device 31 needs to be cooled.

In the "battery temperature control mode", the compressor 12 is operated. The valve opening degree of the flow regulating valve 38 is adjusted such that a sufficient amount of refrigerant flows to the cooling portion 30 in order to cool the HV device 31. The selector valve 52 is switched such that the refrigerant line 34 and the refrigerant line 36 are in fluid communication with each other and the communication line 51 is not in fluid communication with both the refrigerant lines 34 and 36. The flow dividing valve 66 is adjusted such that refrigerant does not flow to the heat exchanger 18 and the entire refrigerant flows to the heat exchanging portion 60. The open/close state of the selector valve 72 is switched such that the refrigerant line 21 and the refrigerant line 22 are in fluid communication with each other and the bypass passage 71 is not in fluid communication with both the refrigerant lines 21 and 22.

In this case, as in the case of the "air-conditioner operation mode", it is possible to cool the HV device 31 by latent heat of vaporization of refrigerant flowing from the heat exchanger 14 to the cooling portion 30, and it is possible to cool the battery 61 by supplying the heat exchanging portion 60 with refrigerant adjusted into a low-temperature low-pressure state by the expansion valve 16. When both the HV device 31 and the battery 61 need to be cooled during a stop of the air conditioner, the compressor 12 is started to circulate refrigerant through the whole of the vapor compression refrigeration cycle 10, high-pressure refrigerant is used to cool the HV device 31, and low-pressure refrigerant is used to cool the battery 61. By so doing, it is possible to efficiently cool both the HV device 31 and the battery 61.

Figure 9:
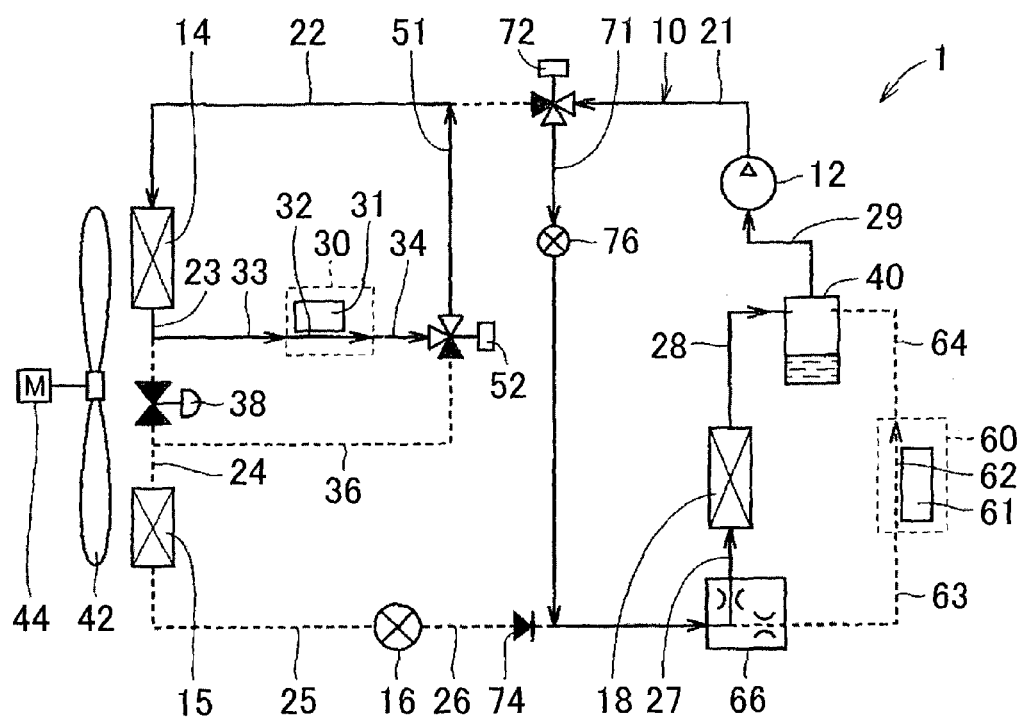
FIG. 9 is a schematic view that shows the operation of the heat exchanging system in a quick heating mode.

FIG. 9 is a schematic view that shows the operation of the heat exchanging system 1 in a quick heating mode. The "quick heating mode" among the operation modes shown in FIG. 3 is an operation mode in which quick heating of the vehicle cabin is required during operation of the vehicle as shown in FIG. 9. At this time, the HV device 31 also generates heat, so the HV device 31 needs to be cooled; however, cooling of the battery 61 is not required.

In the "quick heating mode", in order to heat air-conditioning air in the heat exchanger 18 by causing high-temperature refrigerant to flow to the heat exchanger 18, the compressor 12 is operated, and refrigerant is adiabatically compressed in the compressor 12 into a high-temperature high-pressure state. The flow regulating valve 38 is fully closed. By so doing, the entire refrigerant flowing through the refrigerant line 23 at the outlet of the heat exchanger 14 flows to the cooling portion 30. The selector valve 52 is switched such that the refrigerant line 34 and the communication line 51 are in fluid communication with each other and the refrigerant line 36 is not in fluid communication with both the refrigerant line 34 and the communication line 51.

The flow dividing valve 66 is adjusted such that refrigerant does not flow to the heat exchanging portion 60 and the entire refrigerant flows to the heat exchanger 18. The open/close state of the selector valve 72 is switched such that the refrigerant line 21 and the bypass passage 71 are in fluid communication with each other and both the refrigerant line 21 and the bypass passage 71 are not in fluid communication with the refrigerant line 22.

In this case, the HV device 31 is cooled by the heat pipe in which the HV device 31 serves as the heating portion and the heat exchanger 14 serves as the cooling portion. Refrigerant in a superheated steam state, which is adiabatically compressed in the compressor 12 and throttle-expanded by the expansion valve 76, is guided to the refrigerant line 27 by the flow dividing valve 66, and is used to heat the vehicle cabin in the heat exchanger 18. By exchanging heat between air-conditioning air for heating the vehicle cabin and refrigerant in the heat exchanger 18, it is possible to heat air-conditioning air to ensure desired heating performance. By giving a priority to heating of the vehicle cabin, the open/close state of the flow dividing valve 66 is set such that the entire refrigerant adiabatically compressed in the compressor 12 is caused to flow to the refrigerant line 27 and the entire refrigerant is used to heat the vehicle cabin. Thus, it is possible to increase heating performance for heating the vehicle cabin, and it is possible to early increase the temperature of the vehicle cabin.

Figure 10:
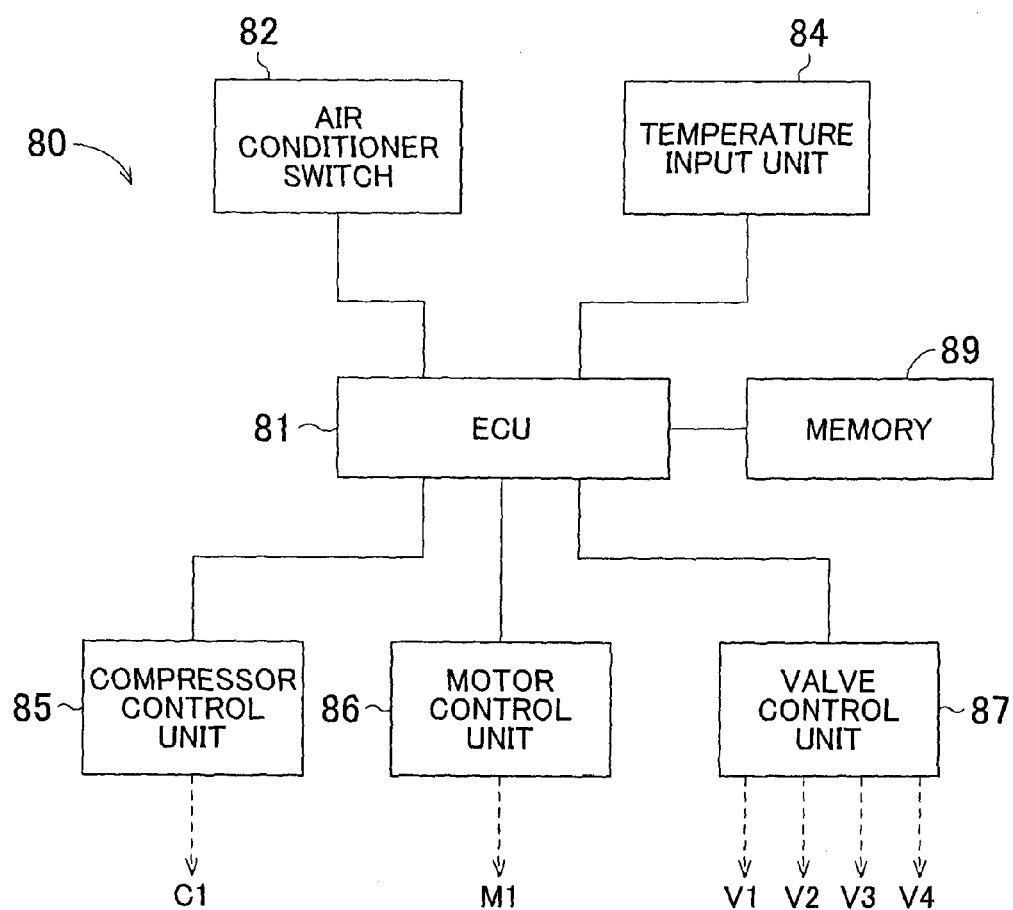
FIG. 10 is a block diagram that shows the details of the configuration of a control unit.

Next, control over the heat exchanging system 1 according to the present embodiment will be described. FIG. 10 is a block diagram that shows the details of the configuration of a control unit 80. The control unit 80 shown in FIG. 10 includes an electronic control unit (ECU) 81 that executes control over the heat exchanging system 1. The ECU 81 receives a signal that indicates an on/off state of the air conditioner from an air conditioner switch 82. The air conditioner switch 82 is, for example, provided on an instrument panel at the front of the cabin. As a passenger of the vehicle operates the air conditioner switch 82, the on/off state of the air conditioner is switched, and cooling of the vehicle cabin is started or stopped.

The ECU 81 receives a signal that indicates a temperature from a temperature input unit 84. The temperatures of refrigerant at the inlet and outlet of the cooling portion 30 are input to the temperature input unit 84 from a sensor that detects the temperature of refrigerant flowing into the cooling portion 30 and a sensor that detects the temperature of refrigerant flowing out from the cooling portion 30. In addition, the temperatures of refrigerant at the inlet and outlet of the heat exchanging portion 60 are input to the temperature input unit 84 from a sensor that detects the temperature of refrigerant flowing into the heat exchanging portion 60 and a sensor that detects the temperature of refrigerant flowing out from the heat exchanging portion 60. Furthermore, the temperature of outside air near the heat exchanging system 1 and the temperature of air-conditioning air of which the temperature is regulated through heat exchange in the heat exchanger 18 are input to the temperature input unit 84.

The control unit 80 further includes a compressor control unit 85, a motor control unit 86 and a valve control unit 87. The compressor control unit 85 controls start and stop of the compressor 12. The motor control unit 86 controls the rotation speed of the motor 44. The valve control unit 87 controls the open/close states of the flow regulating valve 38, selector valves 52 and 72 and flow dividing valve 66. The control unit 80 further includes a memory 89, such as a random access memory (RAM) and a read only memory (ROM). As the ECU 81 executes various processings in accordance with a control program stored in the memory 89, the heat exchanging system 1 is controlled.

The compressor control unit 85 receives a control command transmitted from the ECU 81, and transmits a signal C1 that instructs the compressor 12 to start or stop to the compressor 12. The motor control unit 86 receives a control command transmitted from the ECU 81, and transmits a signal M1 that instructs the motor 44 on the rotation speed to the motor 44. The valve control unit 87 receives a control command transmitted from the ECU 81, transmits a signal V1 that instructs the flow regulating valve 38 on its opening degree to the flow regulating valve 38, transmits a signal V2 that instructs the selector valve 52 on its set open/close state to the selector valve 52, transmits a signal V3 that instructs the flow dividing valve 66 on its opening degree to the flow dividing valve 66, and transmits a signal V4 that instructs the selector valve 72 on its set open/close state to the selector valve 72.

The ECU 81 controls the operation and stop of the compressor 12, the rotation speed of the motor 44, the opening degrees of the flow regulating valve 38 and flow dividing valve 66 and the set open/close states of the selector valves 52 and 72 on the basis of the operating state of the vehicle, the on/off states of the air conditioner and various temperatures input to the temperature input unit 84. The ECU 81 functions as an operation mode switching unit that switches the operation mode of the heat exchanging system 1.

Figure 11:
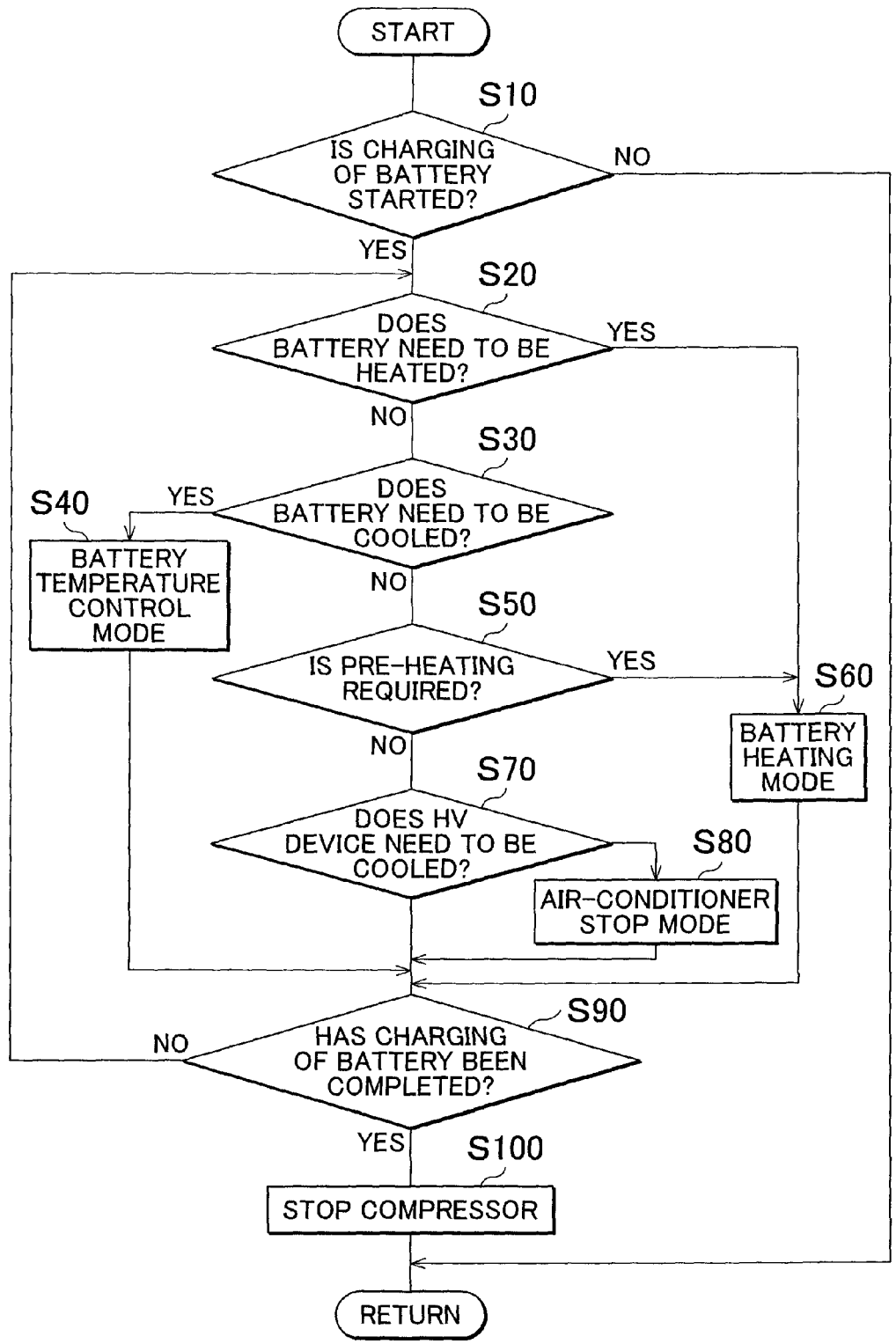
FIG. 11 is a flowchart that shows an example of a control method for the heat exchanging system.

FIG. 11 is a flowchart that shows an example of a control method for the heat exchanging system 1. FIG. 11 shows a method of controlling the temperature of the battery 61 during a stop of the vehicle. As shown in FIG. 11, first, in step (S10), it is determined whether charging of the battery 61 from the external power supply is started. When it is determined in step (S10) that charging of the battery 61 is started, it is subsequently determined in step (S20) whether the battery 61 needs to be heated.

In a low temperature environment, such as cold places having a low outside air temperature, the electrical resistance inside the battery increases, and the input efficiency decreases, so the charging time increases, and the battery charging efficiency decreases. Therefore, the battery 61 needs to be warmed up. It is possible to determine whether the battery 61 needs to be heated on the basis of the temperature of outside air near the heat exchanging system 1 and/or the temperatures of refrigerant at the inlet and outlet of the heat exchanging portion 60, which are input to the temperature input unit 84 shown in FIG. 10. For example, it is applicable that the lower limit of an allowable temperature range of the battery 61 is set to 25° C. and, when the temperature of the battery 61 is lower than the lower limit, it is determined that the battery 61 needs to be heated. A target temperature range varies depending on the type of the battery 61, and also varies depending on the characteristic of the individual battery 61. Therefore, an optimal target temperature range may be prescribed for each individual piece of the battery 61.

When it is determined in step (S20) that the battery 61 does not need to be heated, it is subsequently determined in step (S30) whether the battery 61 needs to be cooled. With the duration of charging of the battery 61, the temperature of the battery 61 increases due to chemical reaction inside the battery 61, so the battery 61 needs to be cooled in order to avoid overheating of the battery 61. It is possible to determine whether the battery 61 needs to be cooled on the basis of the temperatures of refrigerant at the inlet and outlet of the heat exchanging portion 60, input to the temperature input unit 84 shown in FIG. 10. For example, it is applicable that the upper limit of the allowable temperature range of the battery 61 is set to 45° C. and, when the temperature of the battery 61 exceeds the upper limit, it is determined that the battery 61 needs to be cooled.

When it is determined in step (S30) that the battery 61 needs to be cooled, the process proceeds to step (S40), and the heat exchanging system 1 is operated in the "battery temperature control mode". As described with reference to FIG. 8, by supplying low-temperature low-pressure refrigerant throttle-expanded by the expansion valve 16 to the heat exchanging portion 60, it is possible to exchange heat between refrigerant and the battery 61 in the heat exchanging portion 60 to thereby cool the battery 61. At this time, the HV device 31 is driven to execute charging control over the battery 61, so the HV device 31 also needs to be cooled. It is possible to appropriately cool the HV device 31 by controlling the opening degree of the flow regulating valve 38 such that a required amount of refrigerant flows from the heat exchanger 14 to the cooling portion 30.

When it is determined in step (S30) that the battery 61 does not need to be cooled, it is subsequently determined in step (S50) whether pre-heating is required. Here, pre-heating indicates that the vehicle cabin is heated in advance before a passenger gets onto the vehicle and indicates the operation of the air conditioner for suppressing discomfort that the passenger stands cold inside the vehicle cabin in cold weather.

When it is determined in step (S20) that the battery 61 needs to be heated and it is determined in step (S50) that pre-heating is required, the process proceeds to step (S60), and the heat exchanging system 1 is operated in the "battery heating mode". As described with reference to FIG. 6, it is possible to heat the battery 61 by supplying high-temperature refrigerant adiabatically compressed in the compressor 12 to the heat exchanging portion 60, and the vehicle cabin is heated by supplying high-temperature refrigerant to the heat exchanger 18. By appropriately controlling the flow rate of refrigerant flowing to the heat exchanger 18 and the heat exchanging portion 60 with the use of the flow dividing valve 66, it is possible to achieve both desired heating performance and heating of the battery 61. At this time, refrigerant is also supplied to the cooling portion 30 through the heat pipe, so it is possible to appropriately cool the HV device 31.

When it is determined in step (S50) that pre-heating is not required, it is subsequently determined in step (S70) whether the HV device 31 needs to be cooled. When it is determined that the HV device 31 needs to be cooled, the process proceeds to step (S80), and the heat exchanging system 1 is operated in the "air-conditioner stop mode". As described with reference to FIG. 4, by forming the heat pipe, it is possible to appropriately cool the HV device 31 without requiring power of the compressor 12 to be applied to refrigerant.

When the operation of the heat exchanging system 1 is set in the "battery temperature control mode", the "battery heating mode" or the "air-conditioner stop mode", it is subsequently determined in step (S90) whether charging of the battery 61 has been completed. When charging has not been completed yet, the process returns to step (S20), and it is determined again whether the battery 61 needs to be heated. When charging has been completed, the process proceeds to step (S100), and the compressor 12 is stopped (if it is started). After that, the control flow is returned, and it is determined whether charging in step (S10) is started. Even when it is determined in step (S10) that charging is not started, the control flow is immediately returned, and it is determined again whether charging in step (S10) is started.

In this way, by operating the heat exchanging system 1 in the appropriately selected operation mode of the "battery temperature control mode", the "battery heating mode" or the "air-conditioner stop mode" during a stop of the vehicle, it is possible to appropriately cool and heat the battery 61 and cool the HV device 31. Thus, when the battery 61 is charged by the external power supply in cold places, it is possible to execute charging control without decreasing the charging efficiency by heating the battery 61. On the other hand, when the battery 61 is charged in a high-temperature environment, it is possible to cool the battery 61, and it is possible to further reliably suppress overheating of the battery 61. During both heating and cooling of the battery 61, it is possible to cool the HV device 31 by continuously supplying refrigerant toward the HV device 31, so it is possible to further reliably suppress overheating of the HV device 31. In addition, it is possible to pre-heat the vehicle cabin during charging of the battery 61, so it is possible to improve the merchantability of the vehicle that includes the heat exchanging system 1.

Figure 12:
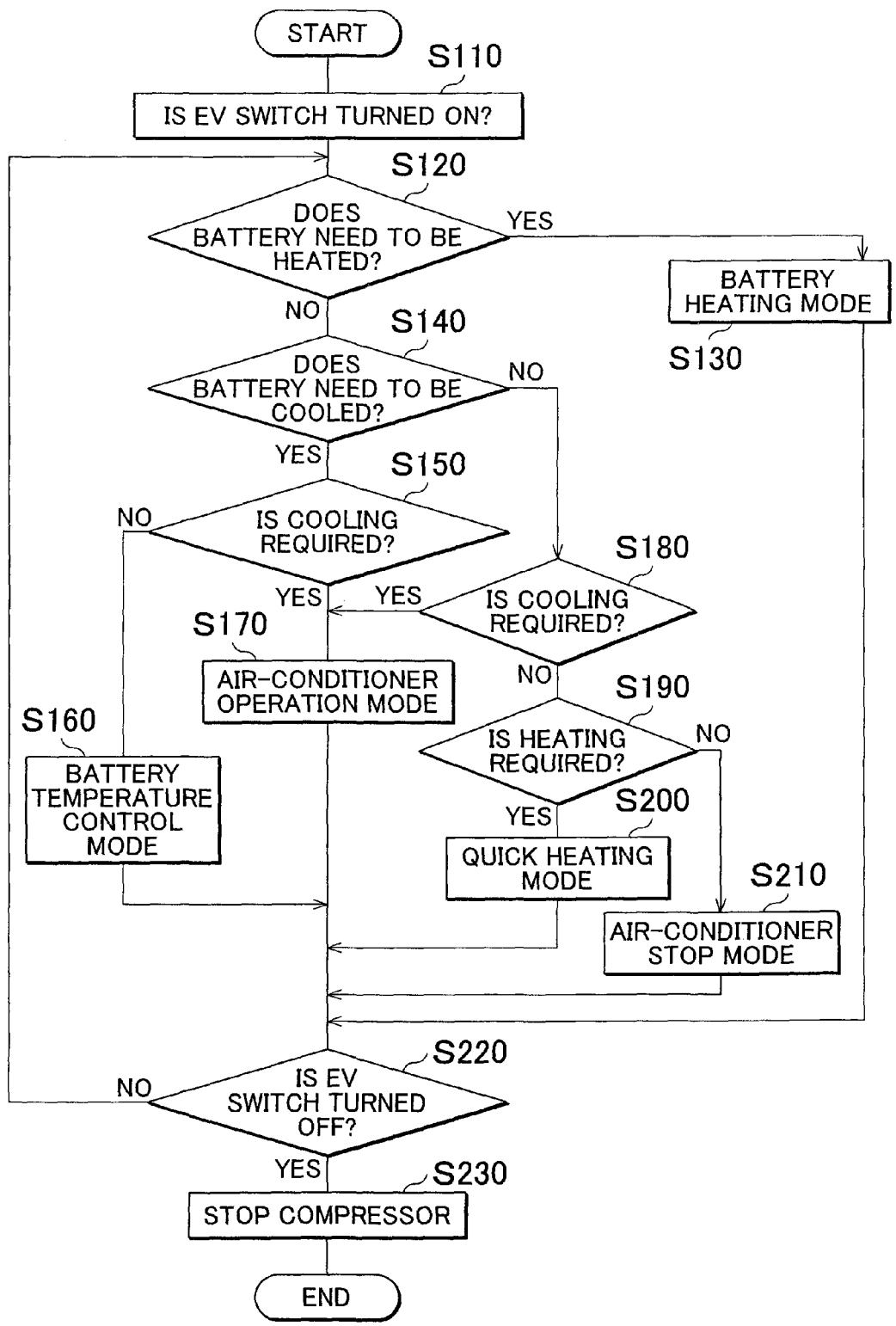
FIG. 12 is a flowchart that shows another example of a control method for the heat exchanging system.

FIG. 12 is a flowchart that shows another example of a control method for the heat exchanging system 1. FIG. 12 shows a method of controlling the temperature of the battery 61 during operation of the vehicle. As shown in FIG. 12, first, in step (S110), an electric vehicle (EV) switch for starting the operation of the vehicle is turned on. Subsequently, in step (S120), it is determined whether the battery 61 needs to be heated. If the temperature of the battery 61 is low in a low-temperature environment, there is a possibility that a chemical change is suppressed inside the battery 61, the output density decreases and then the battery output cannot be ensured, so the battery 61 needs to be heated.

When it is determined in step (S120) that the battery 61 needs to be heated, the process proceeds to step (S130), and the heat exchanging system 1 is operated in the "battery heating mode". As described with reference to FIG. 6, by supplying high-temperature refrigerant adiabatically compressed in the compressor 12 to the heat exchanging portion 60, it is possible to heat the battery 61. When the vehicle cabin needs to be heated, high-temperature refrigerant is also supplied to the heat exchanger 18 by controlling the opening degree of the flow dividing valve 66. By appropriately controlling the flow rate of refrigerant flowing to the heat exchanger 18 and the heat exchanging portion 60 with the use of the flow dividing valve 66, it is possible to achieve both desired heating performance and heating of the battery 61. At this time, refrigerant is also supplied to the cooling portion 30 with the use of the heat pipe, so it is possible to appropriately cool the HV device 31.

When it is determined in step (S120) that the battery 61 needs to be heated, it is subsequently determined in step (S140) whether the battery 61 needs to be cooled. When it is determined that the battery 61 needs to be cooled, it is subsequently determined in step (S150) whether the vehicle cabin needs to be cooled. It is possible to determine whether the vehicle cabin needs to be cooled by determining whether the air conditioner is turned on through operation of the air conditioner switch 82 of the passenger of the vehicle and the current temperature inside the vehicle cabin is higher than a set temperature value of the air conditioner.

When it is determined in step (S150) that the vehicle cabin does not need to be cooled, the process proceeds to step (S160), and the heat exchanging system 1 is operated in the "battery temperature control mode". As described with reference to FIG. 8, by supplying low-temperature low-pressure refrigerant throttle-expanded by the expansion valve 16 to the heat exchanging portion 60, it is possible to cool the battery 61 by exchanging heat between refrigerant and the battery 61 in the heat exchanging portion 60. At this time, it is possible to appropriately cool the HV device 31 that generates heat due to charging control over the battery 61 by controlling the opening degree of the flow regulating valve 38 such that a required amount of refrigerant flows from the heat exchanger 14 to the cooling portion 30.

When it is determined in step (S140) that the battery 61 does not need to be cooled, it is subsequently determined in step (S180) whether the vehicle cabin needs to be cooled. When it is determined in step (S150) or step (S180) that the vehicle cabin needs to be cooled, the process proceeds to step (S170), and the heat exchanging system 1 is operated in the "air-conditioner operation mode". As is described with reference to FIG. 1, the battery 61 is cooled by supplying low-temperature low-pressure refrigerant throttle-expanded by the expansion valve 16 to the heat exchanging portion 60, and the vehicle cabin is cooled by supplying low-temperature refrigerant to the heat exchanger 18. By appropriately controlling the flow rate of refrigerant flowing to the heat exchanger 18 and the heat exchanging portion 60 with the use of the flow dividing valve 66, it is possible to achieve both desired cooling performance and cooling of the battery 61. At this time, it is possible to appropriately cool the HV device 31 by controlling the opening degree of the flow regulating valve 38 such that a required amount of refrigerant flows from the heat exchanger 14 to the cooling portion 30.

When it is determined in step (S180) that the vehicle cabin does not need to be cooled, it is subsequently determined in step (S190) whether the vehicle cabin needs to be heated. When it is determined that the vehicle cabin needs to be heated, the process proceeds to step (S200), and the heat exchanging system 1 is operated in the "quick heating mode". As is described with reference to FIG. 9, the vehicle cabin is heated by supplying high-temperature refrigerant adiabatically compressed in the compressor 12 to the heat exchanger 18, and it is possible to early increase the temperature inside the vehicle cabin. At this time, refrigerant is also supplied to the cooling portion 30 through the heat pipe, so it is possible to appropriately cool the HV device 31.

When it is determined in step (S190) that the vehicle cabin does not need to be heated, the process proceeds to step (S210), and the heat exchanging system 1 is operated in the "air-conditioner stop mode". As described with reference to FIG. 4, by forming the heat pipe, it is possible to appropriately cool the HV device 31 without requiring power of the compressor 12 to be applied to refrigerant.

When the heat exchanging system 1 is set so as to be operated in any one of the five operation modes shown in FIG. 3, it is subsequently determined in step (S220) whether the EV switch is turned off. When the EV switch is not turned off and remains on, the process proceeds to step (S120), and it is determined again whether the battery 61 needs to be heated. When the EV switch is turned off, the process proceeds to step (S230), and the compressor 12 is stopped (if it is started). By so doing, the vehicle is stopped, and the operation of the heat exchanging system 1 also ends.

In this way, by operating the heat exchanging system 1 in the operation mode appropriately selected from among the five operation modes during operation of the vehicle, it is possible to appropriately cool and heat the battery 61 and cool the HV device 31. Thus, in a low-temperature environment, it is possible to avoid a decrease in the output of the battery 61 by heating the battery 61, and it is possible to ensure the service performance of the vehicle. On the other hand, in a high-temperature environment, it is possible to cool the battery 61, and it is possible to further reliably suppress overheating of the battery 61. It is possible to cool the HV device 31 by continuously supplying refrigerant to the HV device 31 during both heating and cooling of the battery 61, so it is possible to further reliably suppress overheating of the HV device 31.

As described above, in the heat exchanging system 1 according to the present embodiment, by connecting the heat exchanging portion 60 that exchanges heat between refrigerant and the battery 61 in parallel with the heat exchanger 18 downstream of the expansion valve 16, it is possible to supply low-temperature refrigerant throttle-expanded by the expansion valve 16 to the heat exchanging portion 60. At this time, by releasing heat from the battery 61 to refrigerant, it is possible to cool the battery 61.

In addition, the heat exchanging system 1 includes the bypass passage 71, the expansion valve 76 and the selector valve 72. The bypass passage 71 provides fluid communication between the refrigerant line 21 adjacent to the outlet of the compressor 12 and the refrigerant line 26 adjacent to the outlet of the expansion valve 16. The expansion valve 76 decompresses refrigerant flowing through the bypass passage 71. The selector valve 72 switches the flow of refrigerant such that refrigerant flows via the bypass passage 71. By so doing, it is possible to supply high-temperature refrigerant adiabatically compressed in the compressor 12 to the heat exchanging portion 60. By so doing, it is possible to heat the battery 61 by transferring heat from high-temperature refrigerant to the battery 61.

Thus, it is possible to adjustably heat or cool the battery 61 with a simple configuration, so it is possible to appropriately adjust the temperature of the battery 61.

By providing the flow dividing valve 66 at a branching point between the refrigerant line 27 toward the heat exchanger 18 and the refrigerant line 63 toward the heat exchanging portion 60, it is possible to regulate the flow rate of refrigerant flowing to the heat exchanger 18 for air-conditioning the vehicle cabin and the flow rate of refrigerant flowing to the heat exchanging portion 60 for controlling the temperature of the battery 61. By so doing, when cooling of the vehicle cabin and cooling of the battery 61 are required, it is possible to control the flow rate of refrigerant flowing to the heat exchanger 18 and the heat exchanging portion 60 on the basis of desired cooling performance and cooling performance for cooling the battery 61. In addition, when heating of the vehicle cabin and heating of the battery 61 are required, it is possible to control the flow rate of refrigerant flowing to the heat exchanger 18 and the heat exchanging portion 60 on the basis of desired heating performance and heating performance for heating the battery 61. Thus, it is possible to achieve both air-conditioning of the vehicle cabin and temperature adjustment of the battery 61 with the use of the heat exchanging system 1.

The check valve 74 is provided in the refrigerant line 26 at a side closer to the expansion valve 16 than a connecting position between the bypass passage 71 and the refrigerant line 26. The check valve 74 allows the flow of refrigerant from the expansion valve 16 toward the heat exchanger 18, and prohibits the flow of refrigerant in an opposite direction. The check valve 74 prohibits the flow of refrigerant from the bypass passage 71 toward the expansion valve 16. By so doing, when refrigerant is caused to flow via the bypass passage 71 in order to heat the battery 61 or heat the vehicle cabin, it is possible to prevent high-temperature refrigerant from flowing toward the expansion valve 16. Thus, it is possible to reliably ensure heating performance for heating the battery 61 or heating performance for heating the vehicle cabin.

A path that causes refrigerant to flow to the cooling portion 30 for cooing the HV device 31 that serves as the heat generating source is provided between the heat exchanger 14 and the expansion valve 16. By so doing, it is possible to achieve both cooling of the HV device 31 and heating or cooling of the battery 61 with the use of the heat exchanging system 1 with a simple configuration.

Because the flow regulating valve 38 that adjusts the flow rate of refrigerant flowing via the cooling portion 30 is provided, it is possible to adjust the flow rate of refrigerant in response to a request for cooling performance for cooling the HV device 31 in the cooling portion 30. Therefore, it is possible to supply a sufficient amount of refrigerant for cooling the HV device 31 to the cooling portion 30, and it is possible to avoid excessive supply of refrigerant to the cooling portion 30 and occurrence of supercooling of the HV device 31 and an increase in pressure loss of refrigerant.

Because the communication line 51 and the selector valve 52 for forming the path that circulates refrigerant between the heat exchanger 14 and the cooling portion 30 are provided, it is possible to form an annular path that circulates refrigerant between the cooling portion 30 and the heat exchanger 14 without passing through the compressor 12. It is possible to circulate refrigerant between the heat exchanger 14 and the cooling portion 30 by forming the heat pipe along the annular path without operating the compressor 12, so it is possible to reduce power required to cool the HV device 31. The flow of refrigerant via the bypass passage 71 is formed, so, even when power for causing refrigerant to flow to the cooling portion 30 is not applied from the compressor 12, it is possible to reliably cool the HV device 31.

By providing the heat exchanger 15 for cooling refrigerant heated upon receiving heat from the HV device 31 in the cooling portion 30, refrigerant just needs to be supercooled to a degree of supercooling required to cool the cabin of the vehicle with the use of the two heat exchangers 14 and 15, and a degree of supercooling of refrigerant does not need to be excessively increased, so it is possible to reduce the capacity of each of the heat exchangers 14 and 15. Thus, it is possible to ensure the cooling performance for cooling the cabin, and it is possible to reduce the size of each of the heat exchangers 14 and 15, so it is possible to obtain the heat exchanging system 1 that is reduced in size and that is advantageous in installation on the vehicle.

By providing the cooling portion 30 in one of the paths connected in parallel between the heat exchangers 14 and 15, it is possible to further reliably flow a required amount of refrigerant for cooling the HV device 31 to the cooling portion 30. Thus, it is possible to appropriately cool the HV device 31, and it is possible to further reliably avoid insufficient cooling and supercooling of the HV device 31. Not the entire refrigerant flows to the cooling portion 30. Therefore, it is possible to reduce the pressure loss associated with flow of refrigerant via the cooling portion 30, and, accordingly, it is possible to reduce power consumption required to operate the compressor 12 for flowing refrigerant.

When heating of the vehicle cabin and/or heating of the battery 61 with the use of refrigerant in the heat exchanger 18 and/or the heat exchanging portion 60 are performed, part of refrigerant cooled through heat exchange may condense. Therefore, refrigerant that has exchanged heat with air-conditioning air or the battery 61, flowing into the accumulator 40, may be in a wet steam gas-liquid two-phase state where saturated liquid and saturate steam are mixed. In this case, refrigerant is separated into gas and liquid inside the accumulator 40. The accumulator 40 serves as the gas-liquid separator, and refrigerant in a gas-liquid two-phase state, flowing into the accumulator 40, is separated into liquid-state refrigerant liquid and gaseous refrigerant steam inside the accumulator 40.

Inside the accumulator 40, the refrigerant liquid accumulates at the lower side and the refrigerant steam accumulates at the upper side. The end portion of the refrigerant line 29 that delivers refrigerant steam from the accumulator 40 is coupled to the ceiling portion of the accumulator 40. Only refrigerant steam is delivered from the ceiling side of the accumulator 40 to the outside of the accumulator 40 via the refrigerant line 29. By so doing, it is possible to supply the compressor 12 with only gaseous refrigerant that is reliably separated from liquid refrigerant by the accumulator 40. As a result, it is possible to prevent refrigerant liquid from flowing into the compressor 12, and it is possible to prevent occurrence of inconvenience of the compressor 12 due to inclusion of liquid components.

The selector valves 52 and 72 that switch the flow of refrigerant each may be a three-way valve as described above. Alternatively, it is also applicable that a plurality of valves that are able to open or close a path of refrigerant and each of the selector valves 52 and 72 may be formed of these plurality of on-off valves. It is presumable that a space required to arrange the three-way valve is smaller than a space required to arrange the plurality of on-off valves, and it is possible to provide the heat exchanging system 1 having a further reduced size and excellent vehicle mountability using the three-way valve. The on-off valves just need to have a simple structure so as to be able to open or close the refrigerant line, so the on-off valves are not expensive, and it is possible to provide the further low-cost heat exchanging system 1 using the plurality of on-off valves.

Note that, in the above description, the heat exchanging system 1 that optimally regulates the temperature of the temperature regulated portion mounted on the vehicle is described by taking the battery 61 as an example. The temperature regulated portion of which the temperature is regulated by the heat exchanging system 1 according to the invention is not limited to the battery 61. For example, an ATF cooler that cools automatic transmission fluid (ATF) for cooling a transaxle mounted on a vehicle may be set as the temperature regulated portion.

ATF is cooled by the ATF cooler that recovers heat generated by a heat generating member, such as a motor generator and gears, that constitute the transaxle. By so doing, the transaxle is cooled. ATF needs to be cooled for the purpose of protection of components, such as coils and a magnet of the motor generator, suppressing degradation of ATF, and the like. However, if ATF is excessively cooled, the viscosity of ATF increases, leading to insufficient lubrication of the gears and an increase in friction loss, so ATF is desirably warmed moderately. Then, it is applicable that the ATF cooler is applied to the heat exchanging system 1 according to the present embodiment and ATF is cooled and heated in the heat exchanging portion 60.

In addition, the temperature regulated portion is not limited to an in-vehicle device mounted on a vehicle; instead, it may be any device or part of any device that is required to be cooled or heated in accordance with conditions, such as an outside air temperature.

The embodiment according to the invention is described above; however, the embodiment described above should be regarded as only illustrative in every respect and not restrictive. The scope of the invention is indicated not by the above description but by the appended claims, and is intended to include all modifications within the meaning and scope equivalent to the scope of the appended claims.

The heat exchanging system according to the aspect of the invention may be particularly advantageously applied to temperature regulation of the temperature regulated portion, such as a battery, that needs to be cooled or heated, using the vapor compression refrigeration cycle for cooling or heating the cabin of the vehicle.

The invention claimed is:
1. A heat exchanging system that exchanges heat between refrigerant and a temperature regulated portion, comprising:
    a compressor circulating the refrigerant;
    a first heat exchanger exchanging heat between the refrigerant and outside air;
    a first decompressor decompressing the refrigerant;
    a second heat exchanger exchanging heat between the refrigerant and air-conditioning air;
    a heat exchanging portion connected in parallel with the second heat exchanger and exchanging heat between the refrigerant and the temperature regulated portion;
    a bypass passage providing fluid communication between a path of the refrigerant between the compressor and the first heat exchanger and a path of the refrigerant between the first decompressor and the heat exchanging portion;
    a second decompressor provided in the bypass passage and decompressing the refrigerant flowing through the bypass passage;
    a selector valve allowing or interrupting flow of the refrigerant via the bypass passage;
    a heat generating source;
    a cooling portion cooling the heat generating source with the use of the refrigerant flowing between the first heat exchanger and the first decompressor; and
    another selector valve switching between a first position and a second position,
    wherein when the another selector valve is in the first position, the refrigerant flows in a circulation path in which the refrigerant continuously circulates from the first heat exchanger to the cooling portion and from the cooling portion back to the first heat exchanger without reaching any of the first decompression device, the compressor and the second heat exchanger, and wherein when the another selector valve is in the second position, the refrigerant flows through a path from the cooling portion toward the first decompressor.

2. The heat exchanging system according to claim 1, further comprising:

a flow dividing valve adjusting a flow rate of the refrigerant flowing to the second heat exchanger and a flow rate of the refrigerant flowing to the heat exchanging portion, wherein the bypass passage provides fluid communication between the path of the refrigerant between the compressor and the first heat exchanger and a path of the refrigerant between the first decompressor and the flow dividing valve.

3. The heat exchanging system according to claim 1, further comprising:

a check valve prohibiting flow of the refrigerant from the bypass passage toward the first decompressor.

4. The heat exchanging system according to claim 1, further comprising:

a flow regulating valve adjusting a flow rate of the refrigerant flowing from the first heat exchanger to the first decompressor via the cooling portion.

5. The heat exchanging system according to claim 1, further comprising:

a third heat exchanger connected between the first heat exchanger and the first decompressor and exchanging heat between the refrigerant and outside air, wherein the heat generating source is cooled by the refrigerant flowing through one of paths of the refrigerant, connected in parallel between the first heat exchanger and the third heat exchanger.

6. The heat exchanging system according to claim 1, wherein the temperature regulated portion is a battery.

* * * * *